(12) United States Patent
Jassal et al.

(10) Patent No.: US 10,651,998 B2
(45) Date of Patent: May 12, 2020

(54) SYSTEMS AND METHODS FOR RESOURCE-SPECIFIC REFERENCE SIGNAL CONFIGURATION

(71) Applicants: Aman Jassal, Kanata (CA); Keyvan Zarifi, Ottawa (CA)

(72) Inventors: Aman Jassal, Kanata (CA); Keyvan Zarifi, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/054,707

(22) Filed: Aug. 3, 2018

(65) Prior Publication Data

US 2020/0044806 A1 Feb. 6, 2020

(51) Int. Cl.
*H04W 56/00* (2009.01)
*H04L 5/00* (2006.01)

(52) U.S. Cl.
CPC .......... *H04L 5/0051* (2013.01); *H04L 5/0023* (2013.01); *H04L 5/0035* (2013.01); *H04L 5/0053* (2013.01); *H04L 5/0073* (2013.01)

(58) Field of Classification Search
CPC ... H04W 24/10; H04W 36/30; H04W 52/245; H04W 52/48; H04W 24/08;
(Continued)

(56) References Cited

U.S. PATENT DOCUMENTS

2010/0323631 A1* 12/2010 Martin .................. H04W 24/10
455/67.11

2013/0077659 A1* 3/2013 Okuda .................. H04J 3/0667
375/219
(Continued)

FOREIGN PATENT DOCUMENTS

| CN | 108282321 A | 7/2018 |
| CN | 108282794 A | 7/2018 |
| WO | 2018127264 A1 | 7/2018 |

OTHER PUBLICATIONS

3GPP, "3rd Generation Partnership Project; Technical Specification Group Radio Access Network; NR; Radio Resource Control (RRC) protocol specification (Release 15)", Mar. 2018, Version 15.1.0, 268 pages.
(Continued)

*Primary Examiner* — Quan M Hua

(57) ABSTRACT

Networks use channel state information reference signals (CSI-RSs) to measure channel conditions between a user equipment (UE) and a transmit/receive point (TRP) in a cell. The resources configured for the transmission of a CSI-RS may be indicated to the UE using higher layer signaling. Measurement results for a CSI-RS are transmitted by the UE in the form of a measurement report. A need exists for signaling designs that aim to provide more flexible and efficient signaling of CSI-RS resource configurations and measurement reports. In some embodiments, CSI-RS resource configurations and measurement reports are resource-specific. The CSI-RS resource configurations may be independent from an identifier of the cell that the CSI-RS is transmitted from, and the measurement reports do not necessarily include the identifier of the cell. Advantages may include allowing the network to freely allocate CSI-RS resources without the need for reconfiguration at the UE side.

14 Claims, 30 Drawing Sheets

(58) Field of Classification Search
CPC ........... H04W 36/00837; H04W 56/00; H04W 36/0055; H04W 36/0069; H04W 36/04; H04B 17/309; H04J 11/0086
See application file for complete search history.

(56) References Cited

U.S. PATENT DOCUMENTS

2018/0192384 A1* 7/2018 Chou ................. H04W 56/001
2019/0335474 A1 10/2019 Tang et al.

OTHER PUBLICATIONS

Ericsson, Details of SS beam reporting framework. 3GPP TSG RAN WG1 Meeting 90bis Prague, CZ, Oct. 9-13, 2017, R1-1718744, 4 pages.
Huawei et al, Discussion on scope of CSI-RS RRM requirement. 3GPP TSG-RAN WG4 Meeting #86 Athens, Greece, Feb. 26-Mar. 2, 2018, R4-1802665, 4 pages.
LG Electronics, CSI-RS based RRM measurement for L3 mobility. 3GPP TSG RAN WG1 Meeting #90 Prague, Czech Republic Aug. 21-25, 2017, R1-1713133, 8 pages.

\* cited by examiner

```
908 — CSI-RS-ResourceConfigMobility ::=   SEQUENCE {
       -- MO specific values
1801 — isServingCellMO                    BOOLEAN,
       -- Subcarrier spacing of CSI-RS.
1802 — subcarrierSpacing                  SubcarrierSpacing,
       -- List of cells
910 —  csi-RS-CellList-Mobility           SEQUENCE (SIZE (1..maxNrofCSI-RS-CellsRRM)) OF CSI-RS-CellMobility  1803
     }

1803 — CSI-RS-CellMobility ::=            SEQUENCE {
912 —  cellId                             PhysCellId,
914 —  csi-rs-MeasurementBW               SEQUENCE {
         -- Allowed size of the measurement BW in PRBs
1804 —   nrofPRBs                         ENUMERATED { size24, size48, size96, size192, size264},
         -- Starting PRB index of the measurement bandwidth
1806 —   startPRB                         INTEGER(0..2169)
       },
       -- Frequency domain density for the 1-port CSI-RS for L3 mobility
916 —  density                            ENUMERATED {d1,d3}                                        OPTIONAL,
       -- List of resources
918 —  csi-rs-ResourceList-Mobility       SEQUENCE (SIZE (1..maxNrofCSI-RS-ResourcesRRM)) OF CSI-RS-Resource-Mobility  1808
     }
```

FIG. 18

```
2100
2101  MeasResults ::= SEQUENCE{
2102    measId                         MeasId,
2104    measResultServingFreqList      MeasResultServFreqList,  ─2110
2106    measResultNeighCells           CHOICE {
2108      measResultListNR               MeasResultListNR,                    OPTIONAL,
          ...
        }

2110  MeasResultServFreqList ::= SEQUENCE (SIZE (1..maxNrofServingCells)) OF MeasResultServFreq  ~2112
2112  MeasResultServFreq ::=  SEQUENCE {
2114    servFreqId                     ServCellIndex,
2116    measResultServingCell          MeasResultNR,            ─2118
        ...
      }

2118  MeasResultNR ::=  SEQUENCE {
2120    physCellId                     PhysCellId,
        ...
2122    measResult                     SEQUENCE {
2124      cellResults                    SEQUENCE{
2126        resultsSSB-Cell                MeasQuantityResults                OPTIONAL,
2128        resultsCSI-RS-Cell             MeasQuantityResults                OPTIONAL
                                                                              OPTIONAL,
        ...
      };
```

FIG. 21

```
2400
1808—CSI-RS-Resource-Mobility ::=   SEQUENCE {
 920——csi-RS-Index,
        ...
 924——associatedSSB              SEQUENCE {
 928——ssb-Index,
      -- The CSI-RS resource is either QCL'ed not QCL'ed with the associated SSB in spatial parameters
 930——isQuasiColocated           BOOLEAN
                                 OPTIONAL, -- Cond AssociatedSSB
      }
      ...
}
```

FIG. 24

```
2500
1808—CSI-RS-Resource-Mobility ::=   SEQUENCE {
 920——csi-RS-Index,
        ...
 924——associatedSSB              SEQUENCE {
 912——cellId                     PhysCellId,
 928——ssb-Index,
      -- The CSI-RS resource is either QCL'ed not QCL'ed with the associated SSB in spatial parameters
      -- Corresponds to L1 parameter 'QCLed-SSB' (see FFS_Spec, section FFS_Section)
 930——isQuasiColocated           BOOLEAN
                                 OPTIONAL, -- Cond AssociatedSSB
      }
      ...
}
```

FIG. 25

```
2146~ ResultsPerCSI-RS-Index ::=    SEQUENCE {
920~        csi-RS-Index              CSI-RS-Index,
2150~       csi-RS-Results            MeasQuantityResults
2152~       associatedSSB-received    BOOLEAN             OPTIONAL,
        }
```

FIG. 26

```
2118~ MeasResultNR ::=  SEQUENCE {
2122~       measResult
            ...
2132~       rsIndexResults    SEQUENCE {
2134~           resultsSSB-Indexes              ResultsPerSSB-IndexList          OPTIONAL,
2136~           resultsCSI-RS-Indexes           ResultsPerCSI-RS-IndexList       OPTIONAL,
2154~           associatedSSB-acknowledgement   ResultsPerAssociatedSSB-IndexList —2156  OPTIONAL
                                                                                 OPTIONAL
            },
            ...
        };

2156~ ResultsPerAssociatedSSB-IndexList ::= SEQUENCE (SIZE (1..maxNrofCSI-RS)) OF ResultsPerAssociatedSSB-Index
2158~ ResultsPerAssociatedSSB-Index ::=     SEQUENCE {                                        }
920~        csi-RS-Index              CSI-RS-Index,                                          2158
2152~       associatedSSB-received    BOOLEAN
        }
```

FIG. 27

SYSTEMS AND METHODS FOR RESOURCE-SPECIFIC REFERENCE SIGNAL CONFIGURATION

TECHNICAL FIELD

The present disclosure relates generally to wireless communications, and in particular embodiments, to systems and methods for resource-specific reference signal configuration.

BACKGROUND

In some wireless communication systems, user equipments (UEs) wirelessly communicate with one or more transmit/receive points (TRPs) to send data to the TRPs and/or receive data from the TRPs. A wireless communication from a UE to a TRP is referred to as an uplink communication. A wireless communication from a TRP to a UE is referred to as a downlink communication.

A UE may be served by a serving cell that includes one or more TRPs. The UE may communicate with the one or more TRPs to send uplink communications and receive downlink communications.

Resources are required to perform uplink and downlink communications. For example, a TRP may wirelessly transmit data, such as a transport block (TB), to a UE in a downlink communication at a particular frequency and for a particular duration of time. The frequency bandwidth and time duration used are examples of resources.

Resources are also required to transmit reference signals in a wireless communication system. Reference signals are pre-defined signals, known to both the transmitter and the receiver, that can be used to measure the state of a channel. Information regarding the measured state of the channel may be referred to as channel state information (CSI). The reference signal used to generate CSI may be referred to as a channel state information reference signal (CSI-RS). CSI may include, for example, information related to scattering, fading, power decay and signal-to-noise ratio (SNR) in the channel. The CSI may be reported back to the CSI-RS transmitter in the form of a measurement report. The CSI may then be used to adapt uplink and/or downlink transmissions based on the measured state of the channel.

Synchronization signals are used to coordinate the operation of transmitters and receivers in the time domain. In some wireless communication systems, synchronization signal blocks (SSBs) are transmitted by a TRP in order for a UE to determine the frame timing at the TRP. SSBs may also be used by a UE to determine the quality of reception from serving and neighboring cells for mobility purposes. An SSB may be associated with a specific CSI-RS.

A network typically configures the resources associated with reference signals and/or synchronization signals. For example, time and frequency resources may be configured for transmitting CSI-RSs from a TRP to a UE, reporting measurements from the UE back to the TRP, and transmitting SSBs from the TRP to the UE. These resource configurations are signaled to the UE using a signaling message in order for the UE to more reliably receive the CSI-RSs and SSBs. The UE then transmits a signaling message that includes the measurement reports. A need exists for signaling designs that aim to provide more flexible and efficient signaling of CSI-RS resource configurations and measurement reports.

SUMMARY

It is desirable to increase the flexibility and/or efficiency of signaling designs for CSI-RS resource configurations and measurement reports.

According to one aspect of the present disclosure, there is provided a method including: receiving a CSI-RS transmitted from at least one TRP of a cell; and transmitting a measurement report including measurement results for the CSI-RS. The measurement report does not include an identifier of the cell.

In some embodiments, the measurement report does not include an indication of a cell identity.

In some embodiments, the method further includes receiving higher layer signaling indicating a configuration of resources for the CSI-RS. The resources are configured independent of the identifier of the cell.

In some embodiments, in the measurement report, the measurement results for the CSI-RS are identified by the configuration of resources for the CSI-RS.

In some embodiments the CSI-RS is a first CSI-RS, the cell is a first cell, the at least one TRP includes a TRP of the first cell, and the measurement report is a first measurement report, the method further including: receiving a second CSI-RS transmitted from at least one TRP of a second cell. Resources for the second CSI-RS are also configured by the configuration of resources for the first CSI-RS; and transmitting a second measurement report comprising measurement results for the second CSI-RS.

According to another aspect of the present disclosure, there is provided a method performed by a UE, the method including: receiving higher layer signaling indicating a configuration of resources for an associated synchronization signal block (SSB) transmitted from at least one TRP of a cell; and transmitting signaling including feedback indicating whether or not the SSB was detected by the UE.

In some embodiments, the signaling including the feedback is included in a measurement report.

According to yet another aspect of the present disclosure, there is provided an apparatus including: a receiver configured to receive a CSI-RS transmitted from at least one TRP of a cell; and a transmitter configured to transmit a measurement report including measurement results for the CSI-RS. The measurement report does not include an identifier of the cell.

In some embodiments, the measurement report does not include an indication of a cell identity.

In some embodiments, the receiver is further configured to: receive higher layer signaling indicating a configuration of resources for the CSI-RS. The resources are configured independent of the identifier of the cell.

In some embodiments, in the measurement report, the measurement results for the CSI-RS are identified by the configuration of resources for the CSI-RS.

In some embodiments, the CSI-RS is a first CSI-RS, the cell is a first cell, the at least one TRP includes a TRP of the first cell, and the measurement report is a first measurement report. The receiver is further configured to receive a second CSI-RS transmitted from at least one TRP of a second cell. Resources for the second CSI-RS are also configured by the configuration of resources for the first CSI-RS. The transmitter is further configured to transmit a second measurement report comprising measurement results for the second CSI-RS.

According to a further aspect of the present disclosure, there is provided a method including: transmitting higher layer signaling to a UE, the higher layer signaling indicating a configuration of resources for a CSI-RS transmitted from at least one TRP of a cell. The resources are configured independent of an identifier of the cell; and transmitting the CSI-RS from the at least one TRP of the cell.

In some embodiments, at least one of the resources is associated with the identifier of the cell.

In some embodiments, the configuration of the resources for the CSI-RS includes a configuration of resources for an associated SSB transmitted from the at least one TRP of the cell.

In some embodiments, the configuration of the resources for the associated SSB comprises the identifier of the cell.

In some embodiments, at least one of the resources is not associated with the identifier of the cell.

In some embodiments, the configuration of the resources for the CSI-RS includes a configuration of resources for a measurement report transmitted from the UE. The measurement report does not include the identifier of the cell.

According to another aspect of the present disclosure, there is provided an apparatus including: a higher layer signal generator configured to generate higher layer signaling indicating a configuration of resources for a CSI-RS transmitted from at least one TRP of a cell. The resources are configured independent of an identifier of the cell; and a transmitter configured to transmit the higher layer signaling to a UE.

In some embodiments, at least one of the resources is associated with the identifier of the cell.

In some embodiments, the configuration of the resources for the CSI-RS includes a configuration of resources for an associated SSB transmitted from the at least one TRP of the cell.

In some embodiments, the configuration of the resources for the associated SSB comprises the identifier of the cell.

In some embodiments, at least one of the resources is not associated with the identifier of the cell.

In some embodiments, the configuration of the resources for the CSI-RS includes a configuration of resources for a measurement report transmitted from the UE. The measurement report does not include the identifier of the cell.

By performing the method of some embodiments, configured CSI-RS resources may be signaled to a UE in a cell-transparent manner, and measurement reports do not necessarily contain any indication of cell identity. Benefits include: possibly avoiding having to reconfigure CSI-RS resources when there is a handover from one cell to another cell; and/or possibly avoiding providing UEs with knowledge of the cells within the network; and/or possible reduction in signaling overhead.

BRIEF DESCRIPTION OF THE DRAWINGS

For a more complete understanding of the present embodiments, and the advantages thereof, reference is now made to the following descriptions taken in conjunction with the accompanying drawings, in which:

FIGS. 18-27 illustrate example computer code;

DETAILED DESCRIPTION OF ILLUSTRATIVE EMBODIMENTS

Signaling designs relate to the design of uplink or downlink transmissions that convey information about the network. Signaling designs include the design of transmissions that inform a UE of reference signal resource configurations, and the design of transmissions that inform the network of measurement results. According to some signaling designs, CSI-RS resource configurations are signaled to a UE in a cell-specific manner. These signaling designs identify a set of cells by their respective physical identities, and then identify the CSI-RS resource configurations for each cell. Measurement reporting is also performed in a cell-specific manner. Each measurement result in a measurement report is associated with a cell identity. An issue with these signaling designs is that they explicitly tie a set of reference signal resources to a given cell, and provide the UEs with knowledge of the cells within the network. In the event of a handover from one serving cell to another, a UE may need to be reconfigured with new CSI-RS resource configurations. In addition, some parameters of the CSI-RS resource configurations may be fixed for each cell.

Different embodiments are presented herein that may facilitate increasing the flexibility and/or efficiency of signaling designs for CSI-RS resource configurations and measurement reports. In some embodiments, configured CSI-RS resources are signaled to a UE in a cell-transparent manner. Although the CSI-RSs may be associated with specific cells, the signaling design does not provide a UE with knowledge of the cells the CSI-RSs are associated with. Instead, the UE identifies the CSI-RSs by their respective resources. The CSI-RS resources may be configured independent from cell identifiers. An identifier of a cell may be any parameter that may be used to determine the identity of a cell. An identifier of a cell may include, for example, a cell identity. A cell identity may also be referred to as a physical cell identity. An identifier of a cell may also be stored in a CSI-RS index. The UE monitors the configured CSI-RS resources and generates measurement results for the successfully received CSI-RSs. These measurement results are reported by the UE in the form of a measurement report, e.g. to a serving cell, based on the CSI-RS resources that were used to generate them. Each measurement result in the measurement report is identified by its configured CSI-RS resources. The measurement reports do not necessarily contain the identifier of the cell. Moreover, the measurement reports do not necessarily contain any indication of a cell identity. Further embodiments relate to a UE reporting acknowledgements for the successful detection of SSBs associated with the CSI-RSs in the measurement report.

Example Communication System

Figure 1:
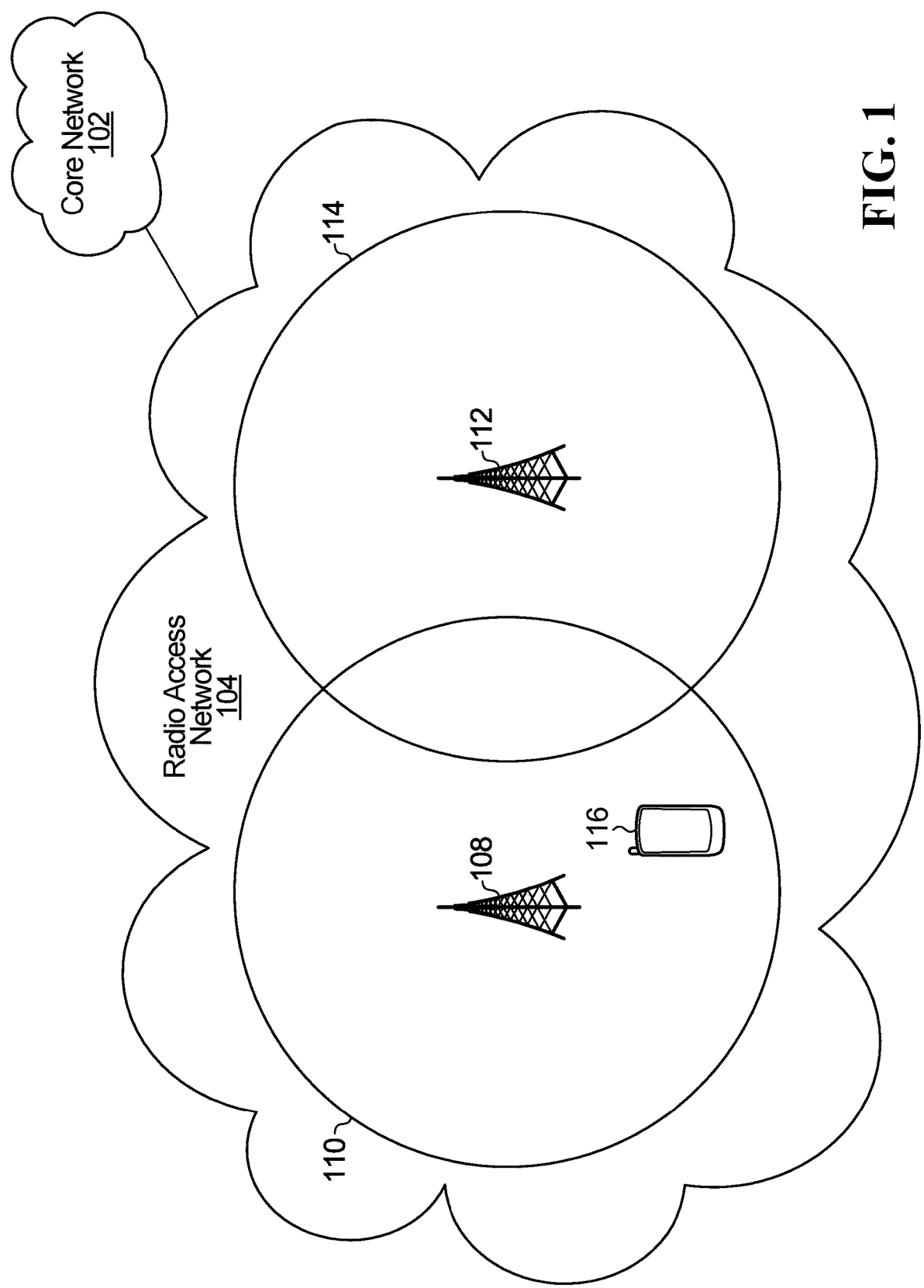
FIG. 1 illustrates an example of a telecommunications network according to one embodiment.

FIG. 1 illustrates an example of a telecommunications network according to one embodiment. The telecommunications network includes a core network 102 and a radio access network 104. The core network 102 is the central part of the telecommunications network and provides various services, e.g. call control/switching and gateways to other networks. The core network 102 comprises network components such as routers, switches, and servers (not shown).

Coupled to the core network 102 is the radio access network 104. The radio access network 104 includes a first TRP 108 providing a first wireless coverage area. The wireless coverage area will be referred to as a cell 110. The radio access network 104 further includes a second TRP 112 providing a second wireless coverage area. The second wireless coverage area will be referred to as cell 114.

Each TRP may be implemented using a radio transceiver, one or more antennas, and associated processing circuitry, e.g. antenna RF circuitry, analog-to-digital/digital-to-analog converters, etc.

Although not shown in FIG. 1, each TRP may be connected to a centralized processing system in the radio access network 104 via a respective communication link. The centralized processing system may be implemented by one or more computational devices, e.g. one or more servers, and the centralized processing system may perform baseband processing of data for/from UEs. In some embodiments, activities such as scheduling and generating control information may be performed in the centralized processing system.

The expression "the network" is used herein, and it may refer to the radio access network, e.g. radio access network 104, or the core network, e.g. core network 102, or another network, depending upon the implementation.

UEs communicate with the network via one or more TRPs. A UE 116 is illustrated within cell 110. The UE 116 communicates with the network via TRP 108. The cell 110 may therefore be called the serving cell of UE 116, and the TRP 108 may be called the serving TRP of UE 116, because the UE 116 is within the cell 110, which is the coverage area of TRP 108.

Although a single TRP 108 is illustrated in FIG. 1, the TRP 108 may instead be a group of TRPs that belong to cell 110 and that work together to communicate with UEs served by the cell 110.

Figure 2:
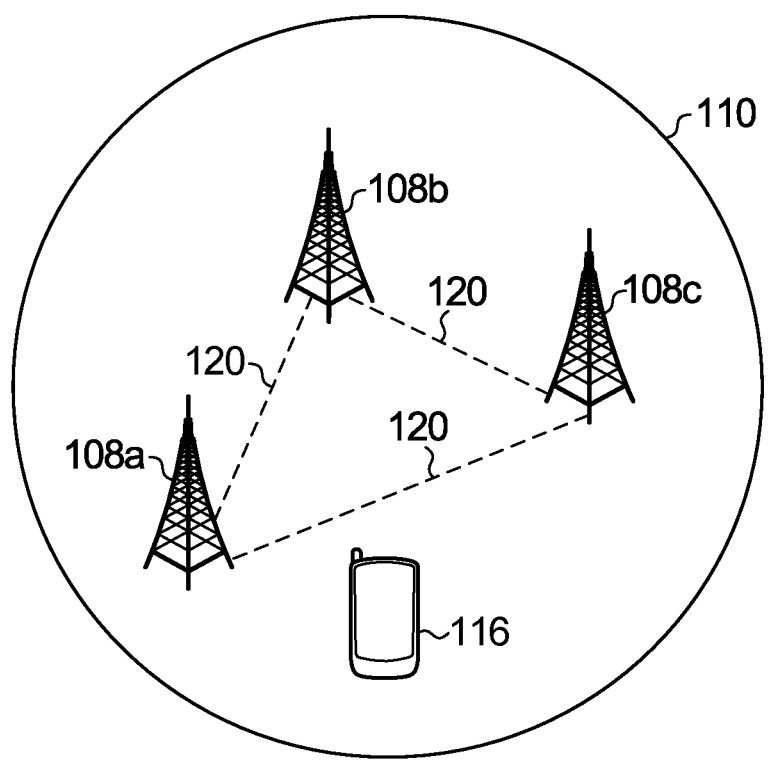
FIG. 2 illustrates the presence of three TRPs cooperating to serve a cell, according to one embodiment.

For example, FIG. 2 illustrates cell 110 for an implementation in which three TRPs 108a-c operate together to communicate with UE 116. The three TRPs 108a-c communicate with each other over backhaul links 120. Although not illustrated, any of the other TRPs discussed herein, e.g. TRP 112 and/or TRP 124 discussed below, may each represent a group of TRPs that operate together to communicate with UEs.

Figure 3:
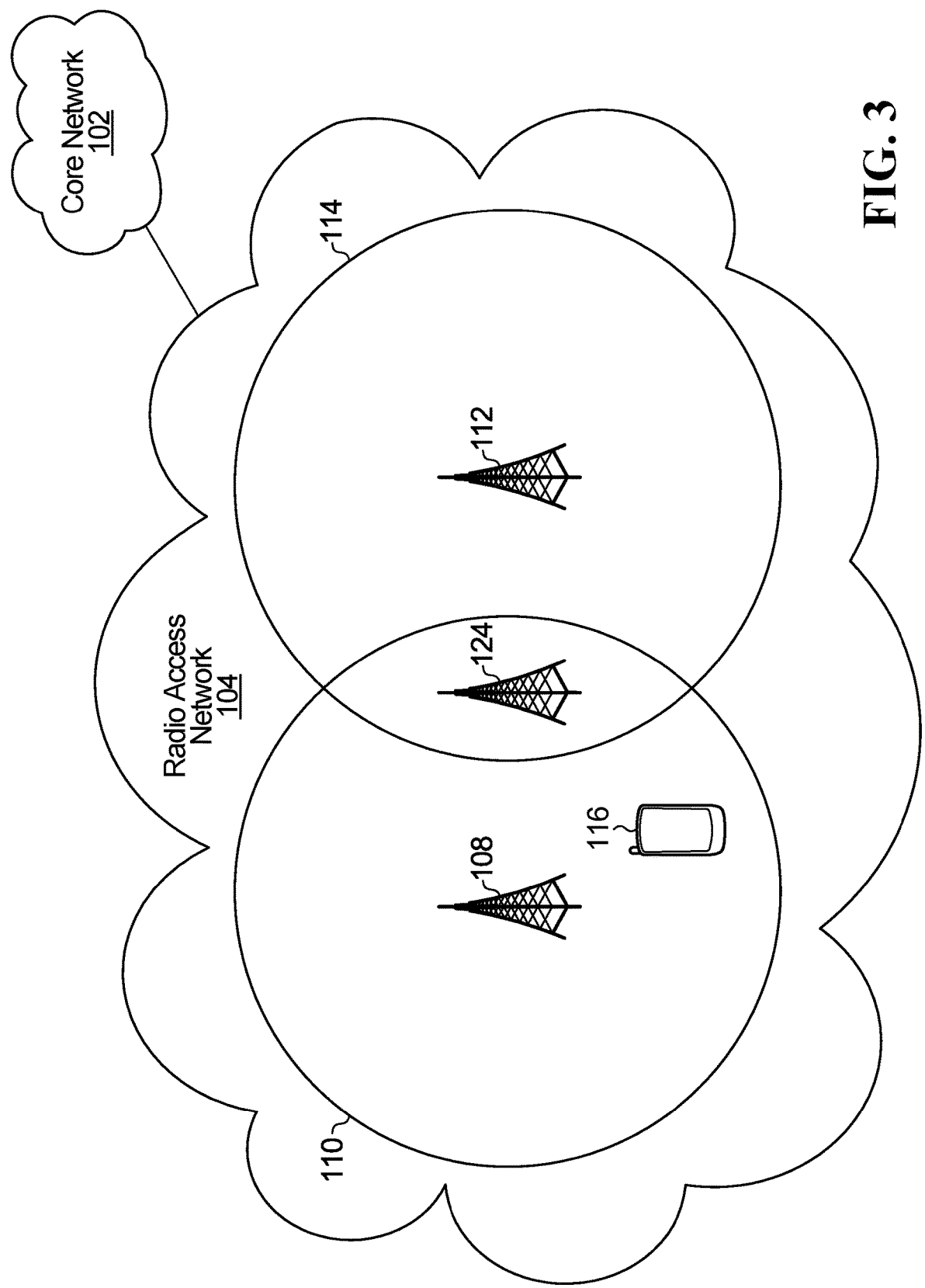
FIG. 3 illustrates a variation of FIG. 1 in which a TRP belongs to two cells.

In some embodiments, a TRP may belong to more than one cell. For example, FIG. 3 illustrates a variation of FIG. 1 in which a TRP 124 is present that belongs to both cell 110 and cell 114. The TRP 124 may communicate with a UE in cell 110 or cell 114.

Figure 4:
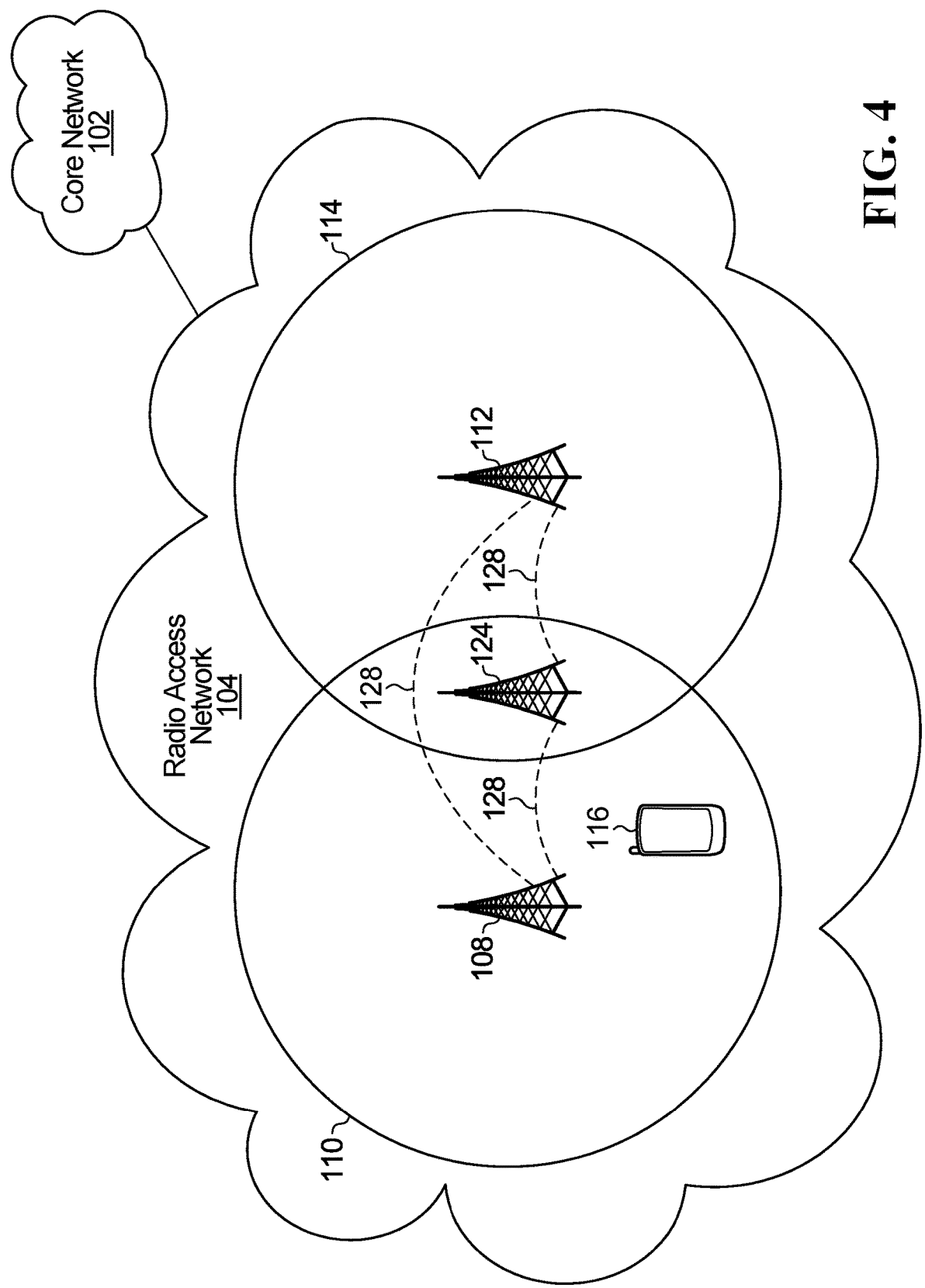
FIG. 4 illustrates a variation of FIG. 3 in which TRPs can communicate with each other over backhaul links.

In some embodiments, TRPs in different cells may communicate with each other over backhaul links. For example, FIG. 4 illustrates a variation of FIG. 3 in which the TRPs can communicate with each other over backhaul links 128.

Figure 5:
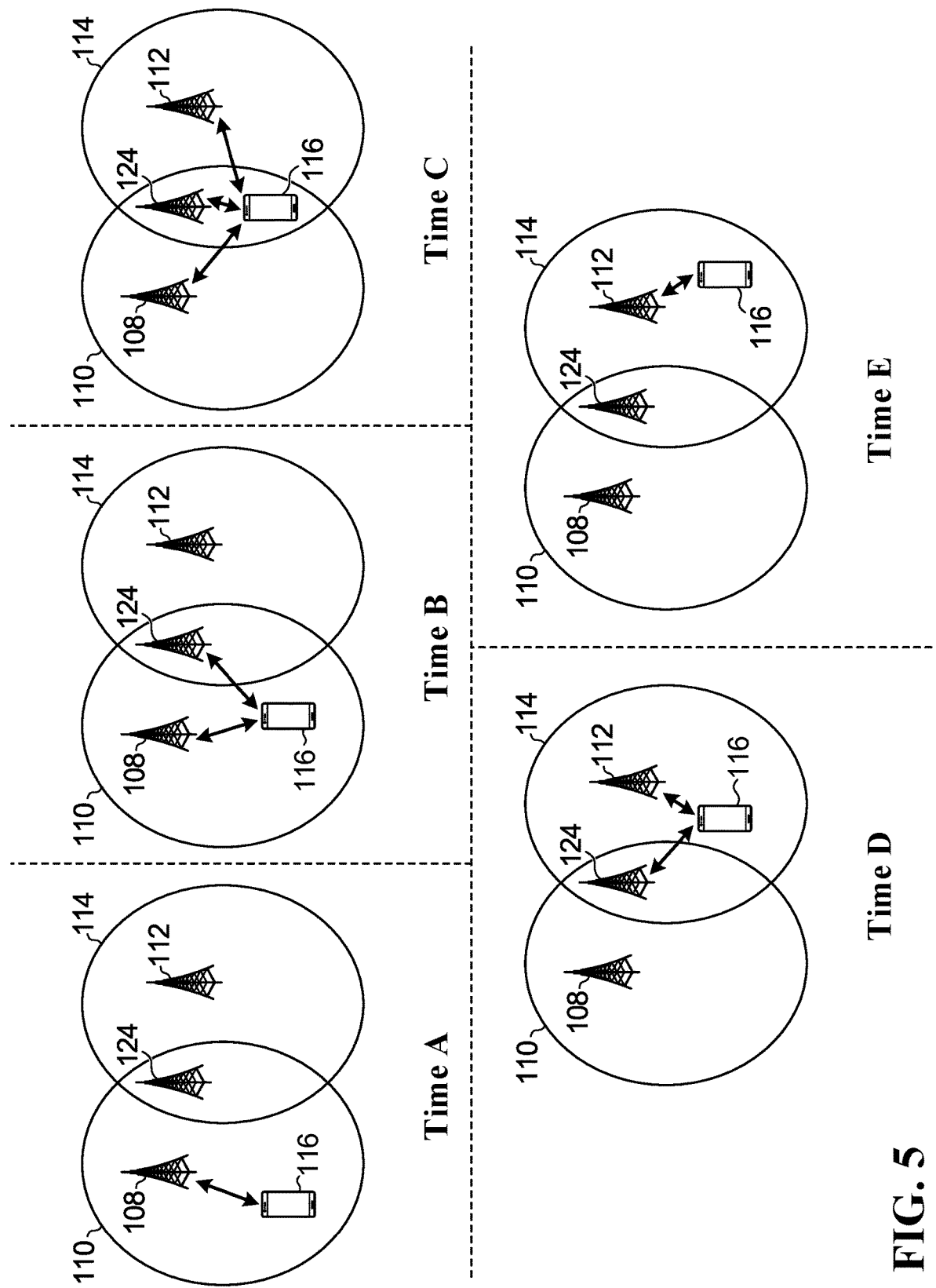
FIG. 5 illustrates an example of simultaneous transmissions, one for each active link.

As the UE 116 moves throughout the radio access network 104, the UE 116 may experience handovers. The movement of a UE through a network, which may result in handovers, is referred to as UE mobility. During a handover, an active link with one TRP is terminated and a new active link with another TRP is established. Each active link may be used to send and receive data to/from the network. In addition, the UE 116 may establish multiple active links with different TRPs. Multiple simultaneous transmissions may therefore occur, one for each active link. This is referred to as dual connectivity. For example, FIG. 5 illustrates five consecutive snapshots in time, labelled "time A", "time B", "time C", "time D", and "time E". In time A the UE 116 only has an active link with TRP 108. In time B, the UE 116 has two independent active links: one with TRP 108 and one with TRP 124. There are multiple links within cell 110. In time C, the UE 116 has three independent active links: one with TRP 108, one with TRP 124, and one with TRP 112. There are multiple links from multiple cells. In time D, the UE 116 has two independent active links: one with TRP 124 and one with TRP 112. There are multiple links within cell 114. In time E, the UE 116 has only one active link with TRP 112. Whenever there is more than one active link, the network may use more than one active link to send data to/receive data from the UE 116. This may increase reliability. For example, at time C data duplication may be performed during handover by having the same data sent to UE 116 from each one of the three TRPs 108, 124, and 112.

Figure 6:
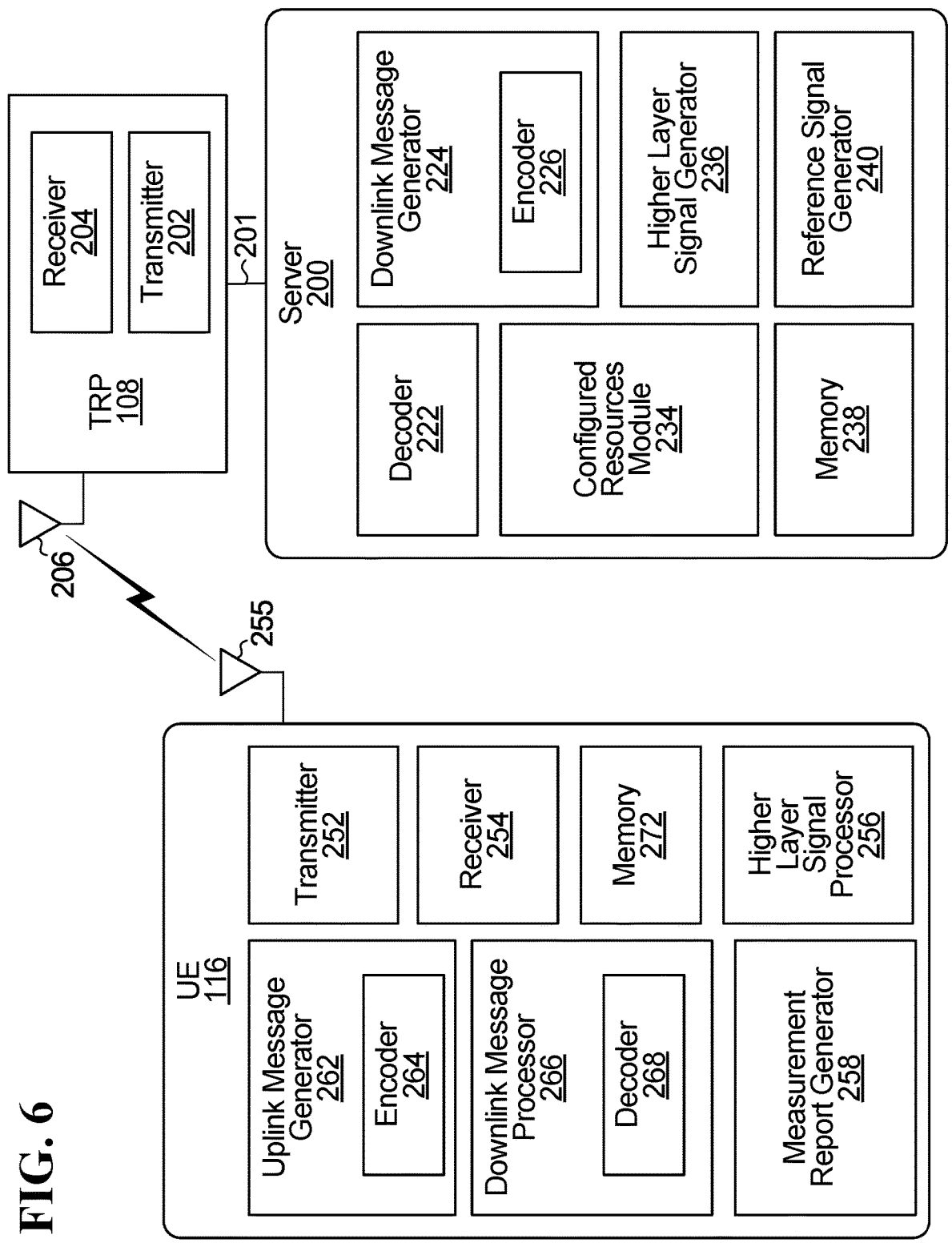
FIG. 6 is a block diagram illustrating an example UE, server, and TRP in more detail.

FIG. 6 is a block diagram illustrating the UE 116 and TRP 108 of FIG. 1 in more detail. The TRP 108 is also coupled to a server 200 (not shown in FIG. 1). The server 200 is part of a network, e.g. the radio access network 104.

The word "TRP" encompasses any network entity that wirelessly communicates with UEs. Therefore, in some implementations, the TRP 108 may be called other names, such as a base station, a base transceiver station, a radio base station, a network node, a transmit/receive node, a Node B, an eNodeB (eNB), a gNB, a relay station, or a remote radio head. Also, in some embodiments, the functions of the TRP 108 may be distributed. For example, some of the modules of the TRP 108 may be located remote from the equipment housing the antennas of the TRP 108, and may be coupled to the equipment housing the antennas over a communication link (not shown).

In FIG. 6, the TRP 108 includes a transmitter 202 and a receiver 204, both coupled to one or more antennas 206. Only one antenna 206 is illustrated. The transmitter 202 and receiver 204 may be implemented as a transceiver. Much of the intelligence of the network is not present at the TRP 108, but is instead present at the server 200. For example, physical layer operations such as encoding and decoding, as well as the generation of downlink control information (DCI), scheduling, and higher-layer signaling is performed at the server 200. The TRP 108 is coupled to the server 200 via a communication link 201. The server 200 may also be coupled to other TRPs (not shown), and the server 200 may also perform equivalent functions for data sent from/received at the other TRPs. In this way, the TRPs may be kept relatively low complexity, with most of the intelligence present on the server 200. In implementation, the server 200 may instead be a plurality of servers coupled to each other. Also, in implementation, some of the server 200 operations may instead be present at the TRPs, and vice versa. For example, the encoding and decoding may be present at the TRP 108 instead of the server 200.

The server 200 includes a decoder 222 for decoding uplink messages received from the UE 116. The uplink messages are received by the receiver 204 of the TRP 108. The server 200 further includes a downlink message generator 224 for generating messages to be transmitted to the UE 116. The messages are transmitted by the transmitter 202 of the TRP 108. The downlink message generator 224 includes an encoder 226 for encoding messages. The server 200 further includes a configured resources module 234 for use in radio resource management (RRM). The configured resources module 234 generates and/or stores time-frequency resources to be used for particular transmissions in the network. Some of these resources may include resources configured for uplink communication and/or downlink communication between the UE 116 and the TRP 108. The downlink time-frequency resources include partitions of time-frequency resources used for sending DCI, as well as partitions of time-frequency resources used for sending transport blocks (TBs). A partition of time-frequency resources used for sending DCI may be referred to as a control channel, and a partition of time-frequency resources used for sending TBs may be referred to as a data channel. The downlink time-frequency resources further include partitions of time-frequency resources configured as reference signal resources, e.g. for sending CSI-RSs, as well as partitions of time-frequency resources configured for sending SSBs and measurement reports.

The server 200 further includes a higher layer signal generator 236 for generating higher layer signaling messages. Higher layer signaling is different from DCI. DCI is dynamic control signaling because it is sent in a control channel that is part of the downlink frame structure. The control channel occurs on a periodic basis and enables the network to dynamically schedule downlink transmissions to the UEs on a frame-by-frame basis. Higher layer signaling is not part of the DCI, but instead is encoded in data packets that are sent in the data channel. For example, a TB carried in a downlink data transmission in a data channel may include data traffic, but it may also include, or instead convey, higher layer signaling. Unlike DCI, higher layer signaling is not dynamic, and so is for semi-statically configuring the UE. An example of higher layer signaling is radio resource control (RRC) signaling. Another example of higher layer signaling is signaling sent in the medium access control (MAC) layer, such as a MAC control element (CE). Higher layer signaling may also be referred to as higher layer control signaling.

Higher layer signaling may be used for RRM. For example, higher layer signaling messages may include resource configuration information. The resource configurations stored and/or generated by the configured resources module 234 may be transmitted from the TRP 108 to the UE 116 through higher layer signaling messages.

The server 200 further includes a reference signal generator 240, which generates reference signals that may be transmitted by the transmitter 202. For example, the reference signal generator 240 may generate a CSI-RS. The reference signal generator 240 may also generate SSBs.

The server 200 further includes a memory 238.

The decoder 222, the downlink message generator 224, the encoder 226, the configured resources module 234, the higher layer signal generator 236, the reference signal generator 240 and/or any signal processing components of the transmitter 202 and receiver 204, may be implemented in the form of circuitry configured to perform the functions of the decoder 222, the downlink message generator 224, the encoder 226, the configured resources module 234, the higher layer signal generator 236, the reference signal generator 240 and/or any signal processing components of the transmitter 202 and receiver 204. In some implementations, the circuitry includes a memory and one or more processors that execute instructions that cause the one or more processors to perform the operations of the decoder 222, the downlink message generator 224, the encoder 226, the configured resources module 234, the higher layer signal generator 236, the reference signal generator 240 and/or any signal processing components of the transmitter 202 and receiver 204. Alternatively, the decoder 222, the downlink message generator 224, the encoder 226, the configured resources module 234, the higher layer signal generator 236 and/or any signal processing components of the transmitter 202 and receiver 204, may be implemented using dedicated circuitry, such as an application specific integrated circuit (ASIC), a graphics processing unit (GPU), or a programmed field programmable gate array (FPGA) for performing the operations of the decoder 222, the downlink message generator 224, the encoder 226, the configured resources module 234, the higher layer signal generator 236, the reference signal generator 240 and/or any signal processing components of the transmitter 202 and receiver 204. In some implementations, the functionality of the server 200 and/or TRPs described herein may be fully or partially implemented in software or modules stored in a memory and executed by the one or more processors.

The UE 116 also includes a transmitter 252 and a receiver 254 coupled to one or more antennas 256. Only one antenna 256 is illustrated. The transmitter 252 and the receiver 254 may be integrated as a transceiver. The UE 116 further includes an uplink message generator 262 for generating messages to be transmitted in uplink transmissions. Generating an uplink message may include encoding data to be transmitted in the message in an encoder 264, and modulating the encoded data. The UE 116 further includes a downlink message processor 266 for processing downlink messages received in downlink transmissions. The downlink message processor 266 includes a decoder 268 for decoding downlink messages. The UE 116 further includes a higher layer signal processor 256 for processing higher layer signaling messages, e.g. for processing higher layer signaling messages generated by the higher layer signal generator 236. As discussed above, these higher layer signaling messages may include resource configuration information.

The UE 116 further includes a measurement report generator 258 for generating measurement reports based on received reference signals. In the case that the UE 116 receives a CSI-RS from the TRP 108, the measurement report generator may produce CSI for the channel between the UE 116 and the TRP 108. The CSI may be reported to the TRP 108 by the uplink message generator 262.

The UE 116 further includes a memory 272.

The uplink message generator 262, encoder 264, downlink message processor 266, decoder 268, higher layer signal processor 256, measurement report generator 258 and/or any signal processing components of the transmitter 252 and receiver 254, may be implemented in the form of circuitry configured to perform the functions of the uplink message generator 262, encoder 264, downlink message processor 266, decoder 268, higher layer signal processor 256, measurement report generator 258, and/or any signal processing components of the transmitter 252 and receiver 254. In some implementations, the circuitry includes a memory and one or more processors that execute instructions that cause the one or more processors to perform the operations of the uplink message generator 262, encoder 264, downlink message processor 266, decoder 268, higher layer signal processor 256, measurement report generator 258, and/or any signal processing components of the transmitter 252 and receiver 254. Alternatively, the uplink message generator 262, encoder 264, downlink message processor 266, decoder 268, higher layer signal processor 256, measurement report generator 258, and/or any signal processing components of the transmitter 252 and receiver 254, may be implemented using dedicated circuitry, such as an ASIC, a GPU, or a FPGA for performing the operations of the uplink message generator 262, encoder 264, downlink message processor 266, decoder 268, higher layer signal processor 256, measurement report generator 258, and/or any signal processing components of the transmitter 252 and receiver 254. In some implementations, the functionality of the UE 116 may be fully or partially implemented in software or modules stored in a memory and executed by the one or more processors.

The TRP 108, server 200, and UE 116 may include other components, but these have been omitted for the sake of clarity.

The TRP 108 and the server 200 form part of a network, e.g. radio access network 104. The UE 116 communicates with the network by sending data to/receiving data from the TRP 108.

Reference Signal Resource Configuration

Figure 7:
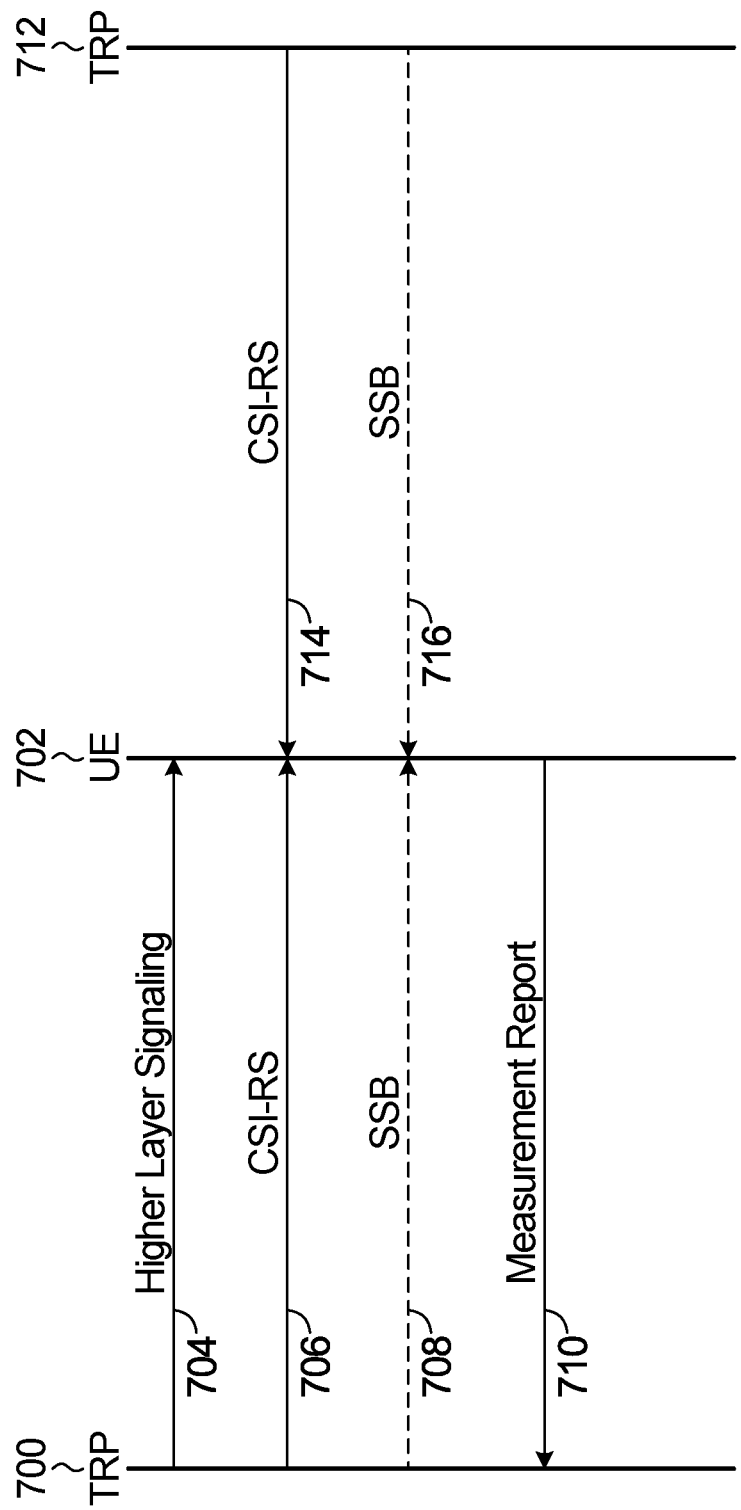
FIG. 7 is a signaling diagram illustrating an example of reference signal resource configuration.

A UE requires knowledge of the resources configured for transmitting/receiving CSI-RSs, measurement reports and SSBs. These resources may be signaled to the UE using higher layer signaling. FIG. 7 is a signaling diagram illustrating an example of reference signal resource configuration. FIG. 7 includes a TRP 700, a UE 702, and a TRP 712. The TRPs 700/712 and/or the UE 702 may have the structure described in relation to FIG. 6.

Also illustrated in FIG. 7 is a higher layer signaling transmission 704, a CSI-RS transmission 706, an optional SSB transmission 708, and a measurement report transmission 710. FIG. 7 further illustrates a CSI-RS transmission 714 and an optional SSB transmission 716. Although the transmissions in FIG. 7 are illustrated in a particular order, the transmissions may be performed in other orders as well. For example, the optional SSB transmission 708 may be performed after the CSI measurement report transmission 710.

From the perspective of the UE 702, the TRP 700 belongs to a serving cell and the TRP 712 belongs to a neighboring cell. The neighboring cell is a non-serving cell. The higher layer signaling transmission 704 includes the transmission of higher layer objects from the TRP 700 to the UE 702. Objects are logical entities that convey information about physical transmissions. One example of a higher layer object is a measurement object. A measurement object configures the objects on which the UE 702 will perform measurements. Reference signals, including CSI-RSs and SSBs, are examples of objects on which the UE performs measurements. The measurement object includes the time and frequency resources configured for the CSI-RSs and SSBs of the TRP 700. With knowledge of these resources, the UE 702 may successfully receive the CSI-RS transmission 706 and the optional SSB transmission 708 sent from the TRP 700. Another example of a higher layer object sent through the higher layer signaling transmission 704 is a reporting object. A reporting object provides the UE 704 with knowledge of the uplink resources configured for measurement reporting. These resources are used by the UE 702 for the measurement report transmission 710 that is sent to the TRP 700. Higher layer objects, including measurement objects and reporting objects, may be UE-specific.

The measurement report transmission 710 may include a measurement reporting object. The measurement reporting object is an object that configures the measurement report sent from a UE, which includes measurement results generated by the UE.

The TRP 712 of the neighboring cell does not transmit higher layer signaling to the UE 702. However, the measurement object sent through the higher layer signaling transmission 704 may provide the UE 702 with the resources configured for the CSI-RSs and SSBs of TRP 712. Therefore, the UE 702 may successfully receive the CSI-RS transmission 714 and the optional SSB transmission 716 sent from the TRP 712. In FIG. 7, measurement reports are not transmitted from UE 702 to TRP 712. Any measurements performed by the UE 702 on the CSI-RS and SSB sent from the TRP 712 are reported to the TRP 700 in the measurement report transmission 710. The TRP 700 may forward the measurement report to the TRP 712 in a backhaul transmission (not shown). This may enable dual connectivity between the UE 702 and the TRPs 700,712. The TRP 700 may also use the measurements related to the optional SSB transmission 716 to determine if a handover from the TRP 700 to the TRP 712 should occur.

Figure 8:
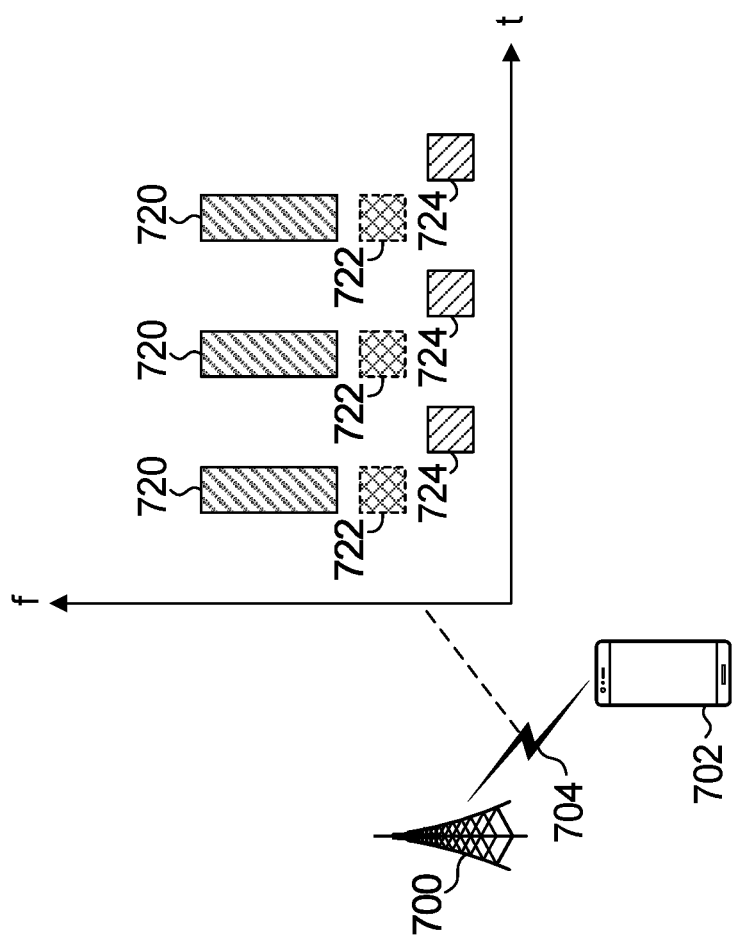
FIG. 8 is a block diagram illustrating an example of a reference signal resource configuration.

The higher layer signaling transmission 704 is shown in more detail in FIG. 8. FIG. 8 is a block diagram illustrating an example of a reference signal resource configuration. FIG. 8 includes a time-frequency resource plot illustrating CSI-RS resources 720, optional SSB resources 722, and measurement report resources 724. Although shown on a single time-frequency resource plot, the CSI-RS resources 720, the optional SSB resources 722 and the measurement report resources 724 may be signaled using different higher layer objects. For example, the CSI-RS resources 720 and the optional SSB resources 722 may be configured by a measurement object, and the measurement report resources 724 may be configured by a reporting object.

The CSI-RS resources 720, the optional SSB resources 722, and the measurement configuration resources 724 include resources configured for the CSI-RS transmission 706, the optional SSB transmission 708, and the measurement report transmission 710, respectively. The CSI-RS resources 720 further include resources configured for the CSI-RS transmission 714, and the optional SSB resources 722 include resources configured for the optional SSB transmission 716. The CSI-RS resources 720, the optional SSB resources 722 and the measurement report resources 724 may be defined by the configured resources module 234, for example.

In FIG. 8, the CSI-RS resources 720, the optional SSB resources 722, and the measurement configuration resources 724 are configured with a periodicity. Therefore, one measurement object may configure periodic CSI-RS transmissions and periodic SSB transmissions. Similarly, one reporting object may configure periodic measurement reporting transmissions. The measurement object and reporting object may define a time period between blocks of configured resources and/or a number of periods. CSI-RS resources, SSB resources, and measurement reporting resources configured without a periodicity are also contemplated.

Higher Layer Signaling for Reference Signal Resource Configuration

Higher layer signaling of reference signal resource configurations will now be discussed in detail with reference to FIGS. 9 to 17.

Figure 9:
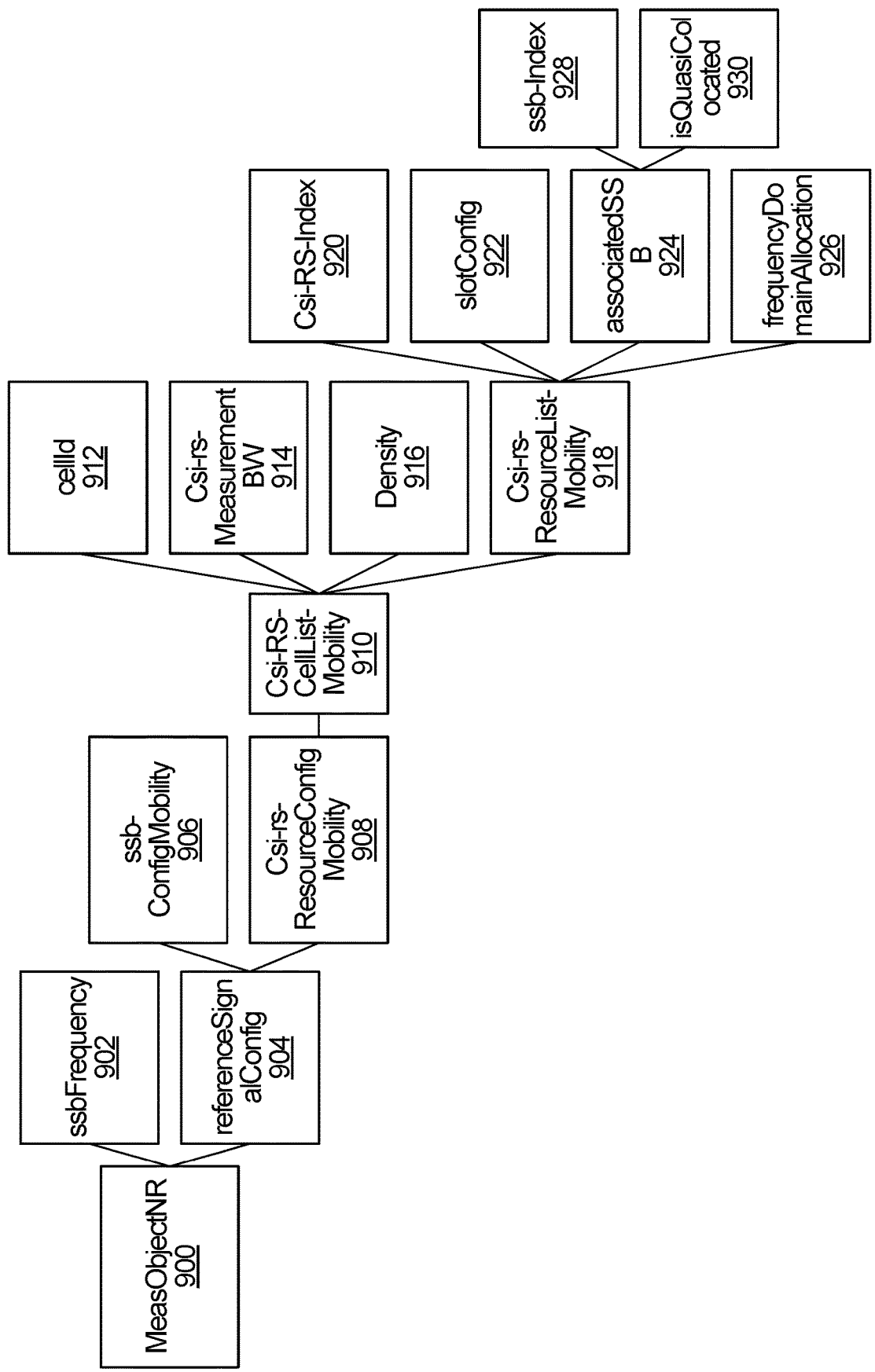
FIGS. 9-17 are hierarchy diagrams illustrating example higher layer signaling designs for the configuration of a measurement object.

FIG. 9 is a hierarchy diagram illustrating one example higher layer signaling design for the configuration of a measurement object. FIG. 9 includes the following variables: a measObjectNR 900, an ssbFrequency 902, a referenceSignalConfig 904, an ssb-ConfigMoblilty 906, a csi-rs-ResourceConfigMobility 908, a csi-RS-CellList-Mobility 910, a cellId 912, a csi-rs-MeasurementBW 914, a density 916, a csi-rs-ResourceList-Mobility 918, a csi-RS-Index 920, a slot-Config 922, an associated SSB 924, a frequencyDomainAllocation 926, a ssb-Index 928 and an isQuasi-Colocated 930. FIG. 9 is merely illustrative of an example measurement object. In general, measurement objects containing more variables or fewer variables are also contemplated.

The measObjectNR 900 is a variable representing a measurement object associated with a UE. The measObjectNR 900 may be sent to the UE in the higher layer signaling transmission 704. The measObjectNR 900 includes the ssbFrequency 902 and the referenceSignalConfig 904 in FIG. 9.

The ssbFrequency 902 contains an indication of the center frequencies of the SSBs that the UE measures.

The refrenceSignalConfig 904 contains the reference signal resource configuration information. The refrenceSignalConfig 904 includes the ssb-ConfigMobility 906 and the csi-rs-ResourceConfigMobility 908 in FIG. 9.

The ssb-ConfigMobility 906 includes information about the set of SSBs a UE measures within a SSB-based RRM measurement time configuration (SMTC) window. These may correspond to SSBs transmitted from the serving cell and neighboring cells.

The csi-rs-ResourceConfigMobility 908 configures the resources specific to the CSI-RSs monitored by the UE. The csi-rs-ResourceConfigMobility 908 includes the csi-RS-CellList-Mobility 910 in FIG. 9.

The csi-RS-CellList-Mobility 910 configures cell-specific CSI-RS resources. The csi-RS-CellList-Mobility 910 includes the cellId 912, the csi-rs-MeasurementBW 914, the density 916 and the csi-rs-ResourceList-Moblity 918 in FIG. 9.

The cellId 912 contains a list of cells, including serving cells and neighboring cells. Each cell is uniquely identified by an identifier and is associated with one or more CSI-RS. For each listed cell, there is a respective entry in csi-rs-measurementBW 914, density 916, and csi-rs-ResourceList-Mobility 918 in FIG. 9.

The csi-rs-measurementBW 914 indicates the starting point and width of the CSI-RS in the frequency domain in physical resource blocks.

The density 916 defines the number of resource elements per slot that a CSI-RS occupies.

The csi-rs-ResourceList-Mobility 918 defines a list of CSI-RS resource configurations. The csi-rs-ResourceList-Mobility 918 includes the csi-RS-Index 920, the slotConfig 922, the associated SSB 924 and the frequencyDomainAllocation 926 in FIG. 9.

The csi-RS-Index 920 assigns each CSI-RS to an index that uniquely identifies it within the list of CSI-RSs resource configurations.

The slotConfig 922 defines the time-domain resources and periodicity of the CSI-RS resources. Time-domain resources and periodicity of CSI-RS resources are discussed above with reference to FIG. 8.

The associatedSSB 924 defines an SSB associated with each CSI-RS. In general, associated SSBs are optional, and are not necessarily configured for a CSI-RS resource. The associatedSSB 924 includes ssb-Index 928 and isQuasiColocated 930 in FIG. 9.

The ssb-Index 928 includes the index of the SSB associated with a CSI-RS. The ssb-Index 928 also includes the time-domain resources of the associated SSB.

The isQuasiColocated 928 is a binary variable indicating whether the CSI-RS and the associated SSB have similar channel properties, e.g. the same average Doppler spread.

The frequencyDomainAllocation 926 indicates the resource elements within a slot that a CSI-RS is mapped to. For example, a CSI-RS might not occupy the entire set of resource elements corresponding to a given slot.

The configuration of the measObjectNR 900 in FIG. 9 is cell-specific. The measObjectNR 900 is structured to identify a set of cells by their respective cell IDs (i.e., cellId 912). The cells would typically include the serving cell of the UE and neighboring cells around the serving cell. For each cell, a corresponding list of CSI-RS resources is defined, i.e., csi-rs-ResourceList-Mobility 918. This higher layer signaling design explicitly ties a set of CSI-RS resources to a cell, and the UE knows which CSI-RS resources are used by each cell. In other words, the cells are not transparent to the UE. A potential drawback of this higher layer signaling design is that the UE is given knowledge of the cells within the network, and may require CSI-RS or SSB resource reconfiguration in the event of a handover to another cell. In addition, some CSI-RS resources including measurement bandwidth and frequency density are configured per cell, which renders the configuration of these parameters coarse. Another potential drawback with this higher layer signaling design is that measurement reporting is performed in a cell-specific manner. Measurements are derived per cell, and the measurement reports include a respective cell ID. Therefore, the UE knows exactly which measurement report belongs to which cell.

Some embodiments below instead provide reference signal resource configurations for mobility and RRM purposes that are not cell-specific. Some embodiments provide a higher layer signaling design that enables cell-transparency at the UE. The cell-transparency may also be referred to as network-transparency. The UE does not know the identity of the cells it is communicating with. Instead, CSI-RSs may be configured that are specific to certain resources. This is referred to as resource-specific CSI-RS configuration. Resource-specific CSI-RS configuration may be independent of the cells each CSI-RS is associated with. In this sense, the CSI-RS configurations may be more flexible.

Some embodiments provide a higher layer signaling design for resource-specific CSI-RS configurations. For example, FIGS. 10 to 17 are hierarchy diagrams illustrating the configuration of a measurement object for a resource-specific CSI-RS configuration. According to these embodiments, higher layer signaling carries information about a set of CSI-RS resources and does not carry any information about a set of cells. Each CSI-RS resource of the set of CSI-RS resources has its own set of information which may or may not include a cell identity. The network transmits a higher layer signaling message to a UE containing information about a CSI-RS measurement configuration for mobility and RRM purposes. The CSI-RS resources may be captured in the form of a container carrying information about a configuration of individual CSI-RS resources. A container may include, for example, a list, a sequence, a set, a map or a vector. The optionality and/or the setting of some information in the CSI-RS measurement configuration may be conditionally based on other information in the CSI-RS measurement configuration or on information located elsewhere in the UE's configuration. In some embodiments, upon receipt of a higher-layer signaling message, the UE may perform one of two actions: if an entry for the corresponding CSI-RS resource already exists in the UE's internal configuration, the UE replaces the existing configuration with the new one; otherwise, the UE adds a new entry for the received CSI-RS resource configuration. If some information in the CSI-RS resource configuration is set optionally, the UE may perform actions or follow procedures as a result of that information being configured in the CSI-RS measurement configuration.

Advantageously, these embodiments provide a resource-specific CSI-RS configuration for UE mobility and RRM that may allow the network to freely allocate CSI-RS resources without the need for reconfiguration at the UE side. CSI-RS resources do not need to be defined on a per cell basis and may be configured with a larger flexibility. For example, the measurement bandwidth and frequency density may be configured on a per CSI-RS resource basis rather than on a per cell basis. In contrast, FIG. 9 illustrates the csi-rs-ResourceList-Mobility 918, the csi-rs-MeasurementBW 914 and the density 916 as being within the csi-RS-CellList-Mobility 910. Therefore, in FIG. 9, the measurement bandwidth and frequency density are cell dependent. This limits all of the CSI-RSs of a cell to one configuration of measurement bandwidth and frequency density, and requires reconfiguration at the UE side should the allocation of CSI-RS resources change.

Figure 10:
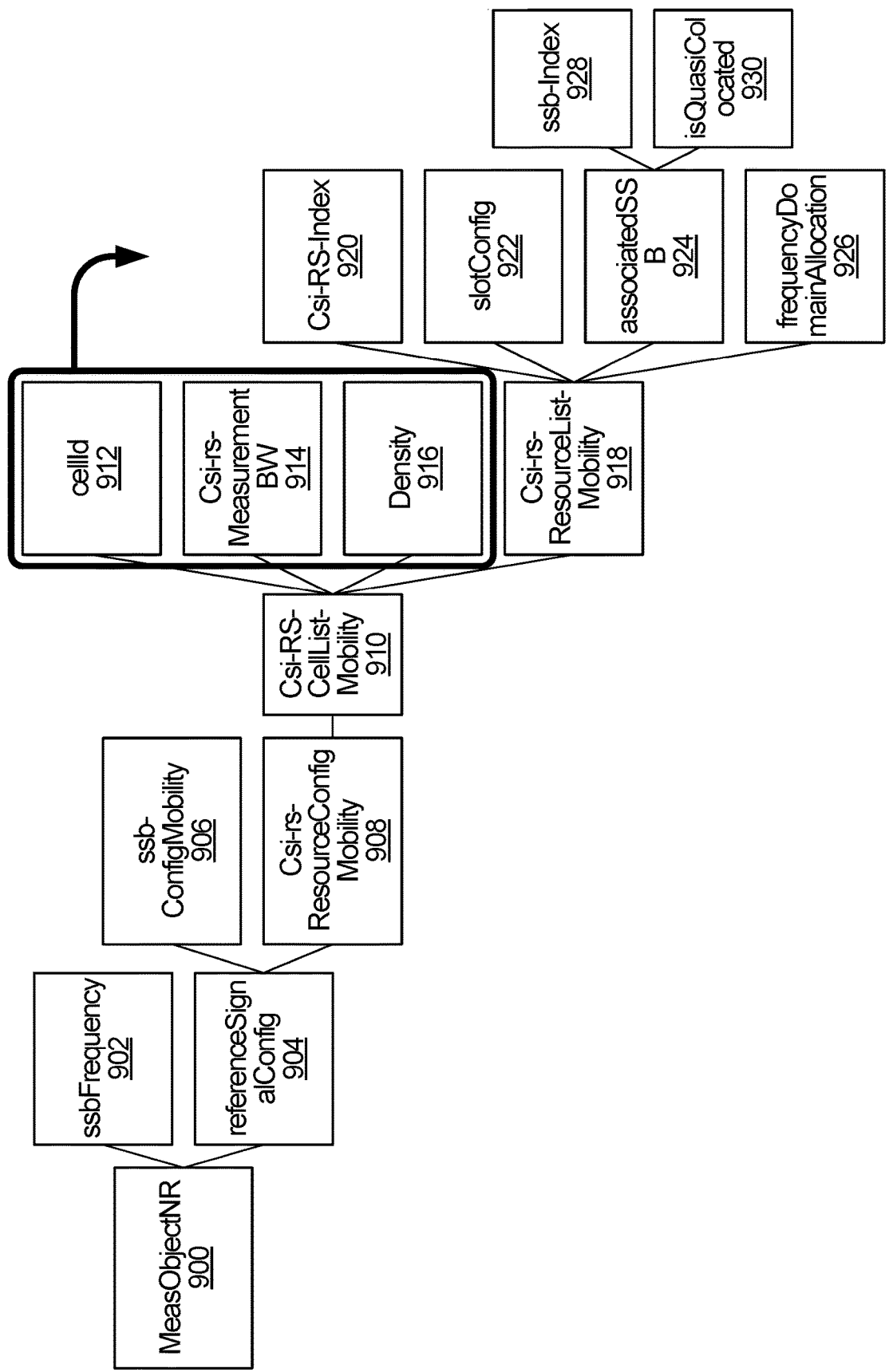
Figure 11:
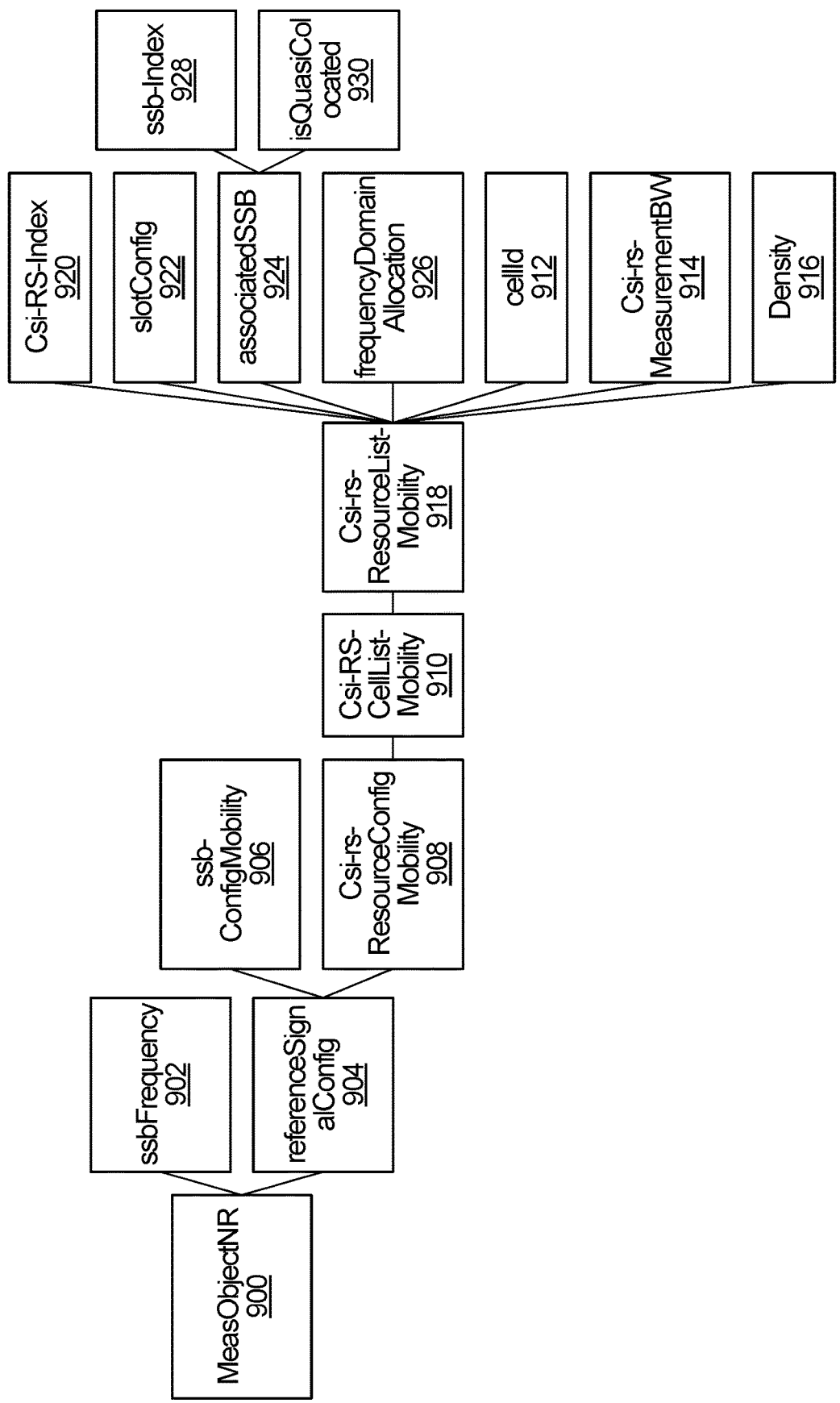

In some embodiments, the resource-specific CSI-RS configurations still contain a cell identity. Examples are shown in FIGS. 10 to 13, which illustrate a higher layer signaling design for a resource-specific CSI-RS configuration with a cell identity included in the CSI-RS configuration. FIGS. 10 and 11 illustrate moving the cellId 912, the csi-rs-MeasurementBW 914 and the density 916 into the csi-rs-ResourceList-Mobility 918. Therefore, in FIG. 11, the cellId 912, the csi-rs-MeasurementBW 914 and the density 916 are specific to CSI-RS resources.

Figure 12:
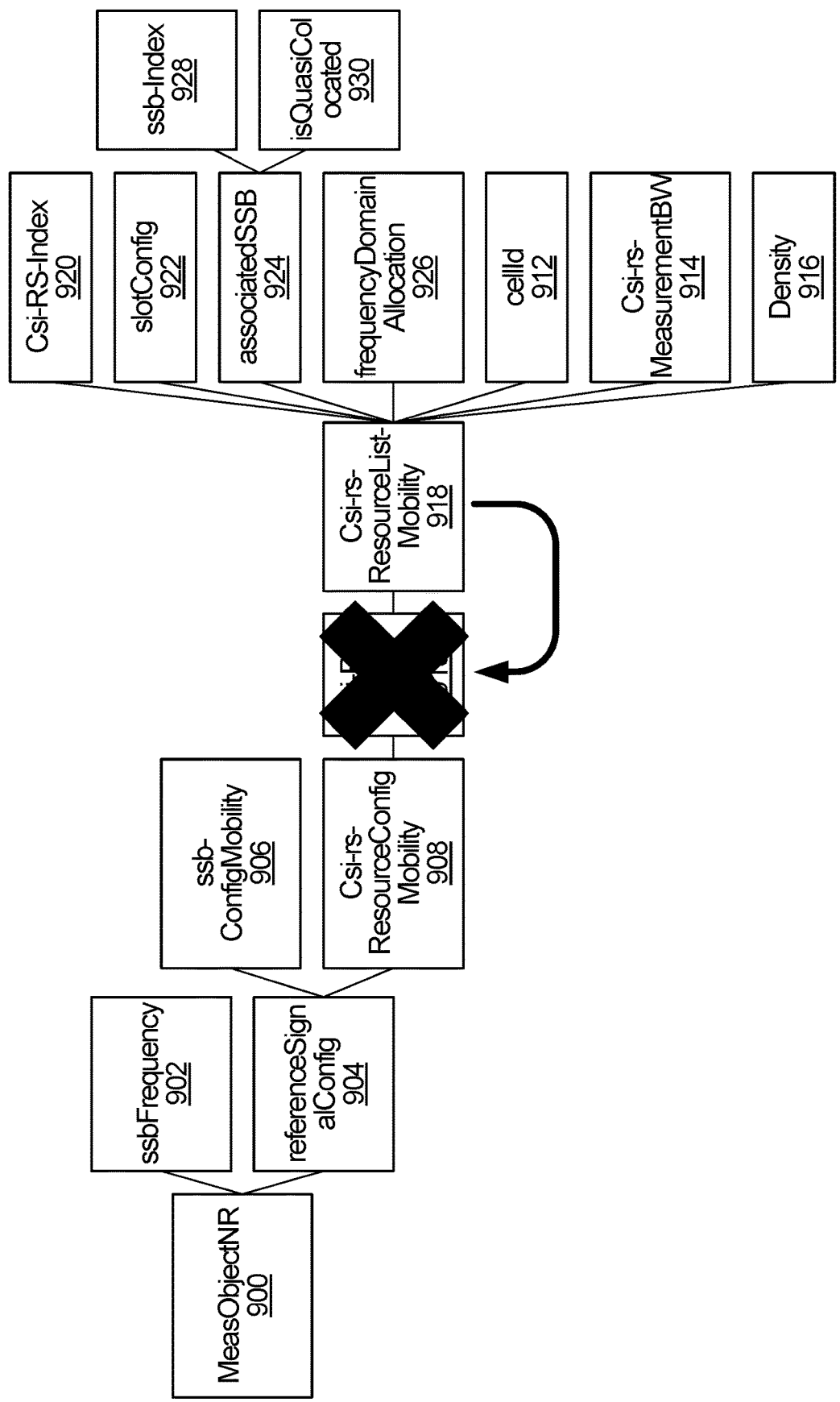
Figure 13:
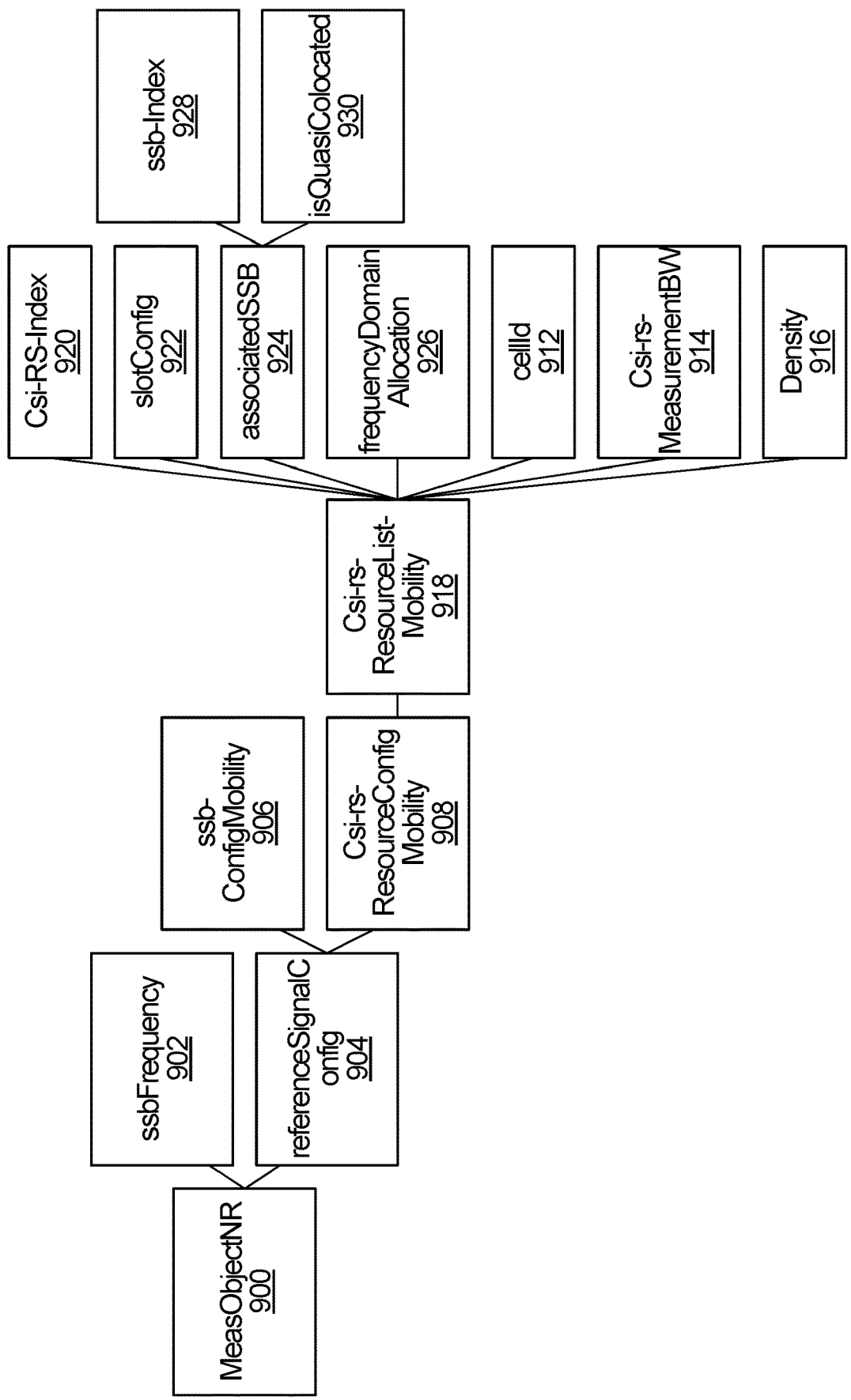

However, the csi-rs-ResourceList-Mobility 918 is contained within the csi-rs-CellList-Mobility 910 in FIG. 11. Therefore, the csi-rs-MeasurementBW 914 and the density 916 are still cell-specific in FIG. 11. The deletion of the csi-RS-CellList-Mobility 910 is illustrated in FIG. 12 and FIG. 13. Through this deletion of the csi-RS-CellList-Mobility 910, the csi-rs-ResourceList-Mobility 918 is no longer defined in a cell-specific manner. Rather, as illustrated in FIG. 13, individual CSI-RS resources are configured, which may include one or more of: an index, a cell identity, a measurement bandwidth configuration, a frequency density configuration, a frequency domain allocation, a time-domain slot configuration, a scrambling identity, and an associated SSB resource. The configuration of CSI-RS resources is independent of an identifier of the cell (e.g., the cellId 912) in FIG. 13.

Figure 14:
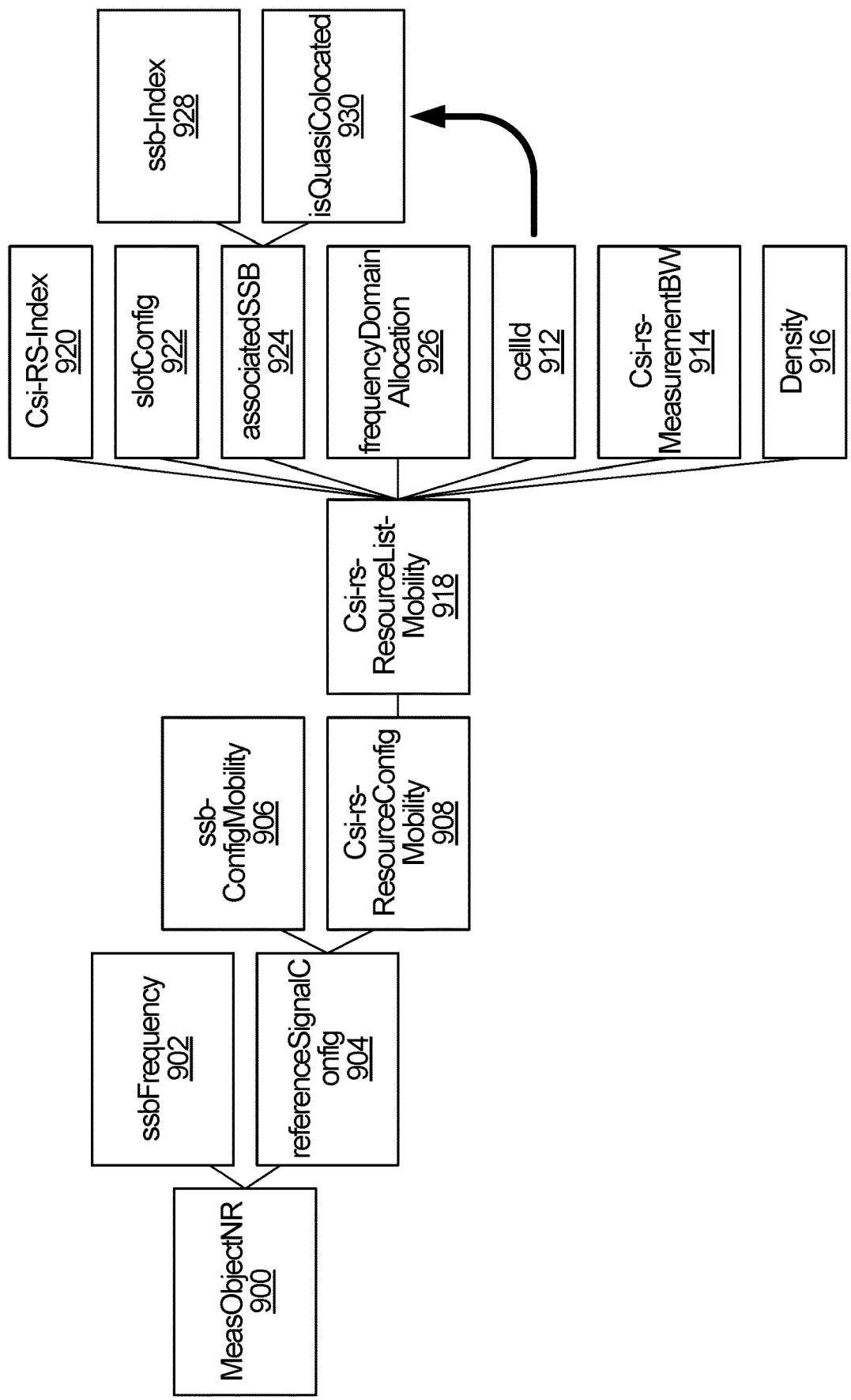
Figure 15:
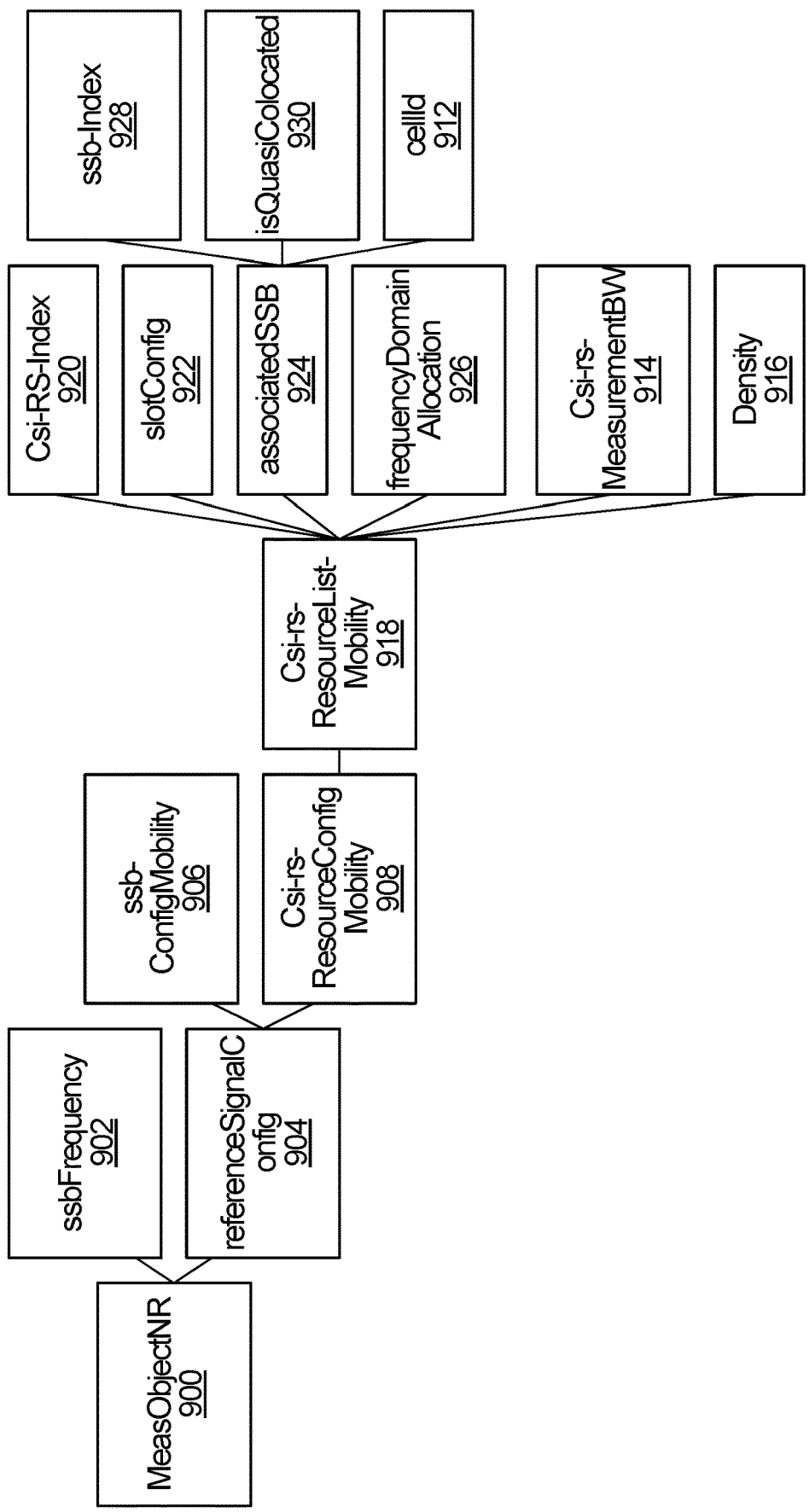

In some embodiments, the associated SSBs of the CSI-RS resources are present and contain a cell identity. Examples are shown in FIGS. 14 and 15, which illustrate a higher layer signaling design for a resource-specific CSI-RS configuration with a cell identity included in the associated SSB resource. FIGS. 14 and 15 illustrate moving the cellID 912 into the associatedSSB 924. An SSB already inherently carries information related to cell identities. Therefore, FIG. 15 illustrates an embodiment in which the only indication of cell ID is contained in the associated SSBs of a CSI-RS.

As illustrated in FIG. 15, the associated SSB resource configuration carries information about a resource index, quasi-colocated information and a cell identity in order to help the UE uniquely identify the SSB resource associated with the CSI-RS resource. If no associated SSB resource is configured for a given CSI-RS resource, the UE will have no knowledge of any association between a CSI-RS resource and a given cell. If an associated SSB resource is configured for a given CSI-RS resource, the UE may conclude that the CSI-RS is synchronized in the time-domain with that associated SSB resource.

Advantageously, in the embodiment of FIG. 15, CSI-RS resource configuration may be decoupled from the network deployment by removing the cell identity from the CSI-RS resource configuration, and moving it to the associated SSB resource configuration. In contrast, the higher layer signaling design of FIG. 9 explicitly provides a cell dependent CSI-RS measurement configuration, allowing the UE to know which CSI-RS resources are used by which cell.

In some signaling mechanisms, if a CSI-RS resource is associated with an SSB resource, and if the SSB transmitted in the associated SSB resource is not correctly detected by the UE, then the UE does not monitor the CSI-RS resource or measure the CSI-RS. No measurement result from the CSI-RS is reported by the UE. An improvement is provided in some embodiments, e.g., in some variations of FIG. 15, in which a UE reporting mechanism is included for associated SSB resource detection. In some embodiments, measurement reports for UE mobility and RRM include an acknowledgement indicating whether or not the UE was able to detect an SSB resource associated with a CSI-RS resource.

In some embodiments, if an associated SSB resource is configured for a given CSI-RS resource, the UE may conclude that the CSI-RS is synchronized in the time domain with that associated SSB resource, and the UE reports an acknowledgement about the detection or failed detection of the SSB sent on the associated SSB resource. The acknowledgement may be included directly in the measurement report corresponding to the associated CSI-RS resource. Alternatively, the acknowledgement may be specified in the form of a separate measurement report or container carrying information including the associated CSI-RS resource index. In the case that no associated SSB resource is configured for a given CSI-RS resource, the UE will have no knowledge of any association between the CSI-RS resource and a cell, in which case the UE does not report whether or not it was able to detect an SSB on an associated SSB resource. Advantageously, embodiments in which an acknowledgment is sent may allow the UE to inform the network about the SSB resources it is able to detect or not. This is an improvement over previous signaling solutions that do not specify an acknowledgement regarding the detection of the SSB on the associated SSB resource. In the previous signaling solutions, the UE does not monitor CSI-RS resources if associated SSBs are not detected correctly.

According to some embodiments, associated SSBs are not configured for the CSI-RS resources. Therefore, the CSI-RS resources are cell-transparent. Examples are described below in relation to FIGS. 16 and 17, which illustrate a cell-transparent and resource-specific CSI-RS configuration.

Figure 16:
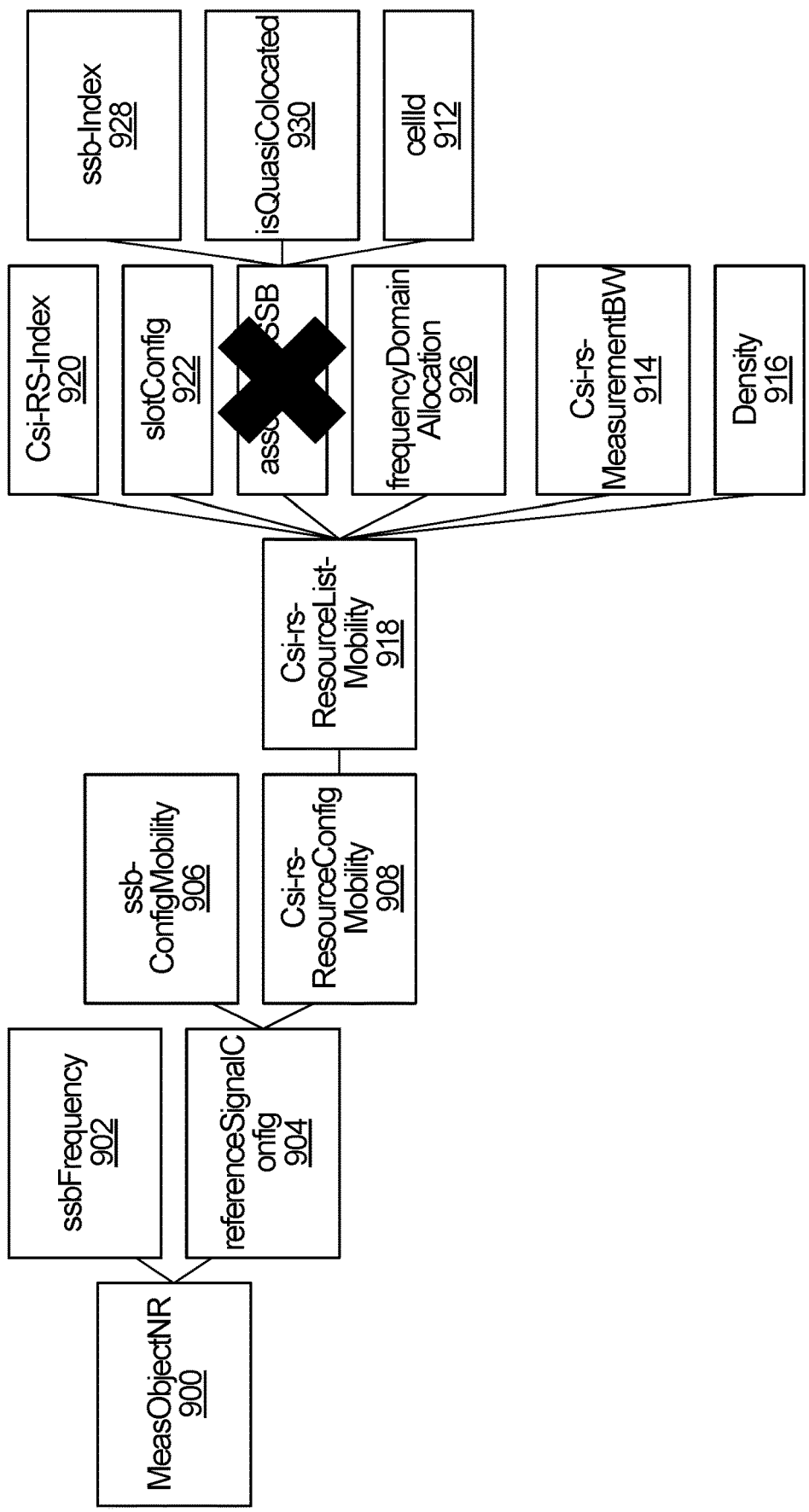
Figure 17:
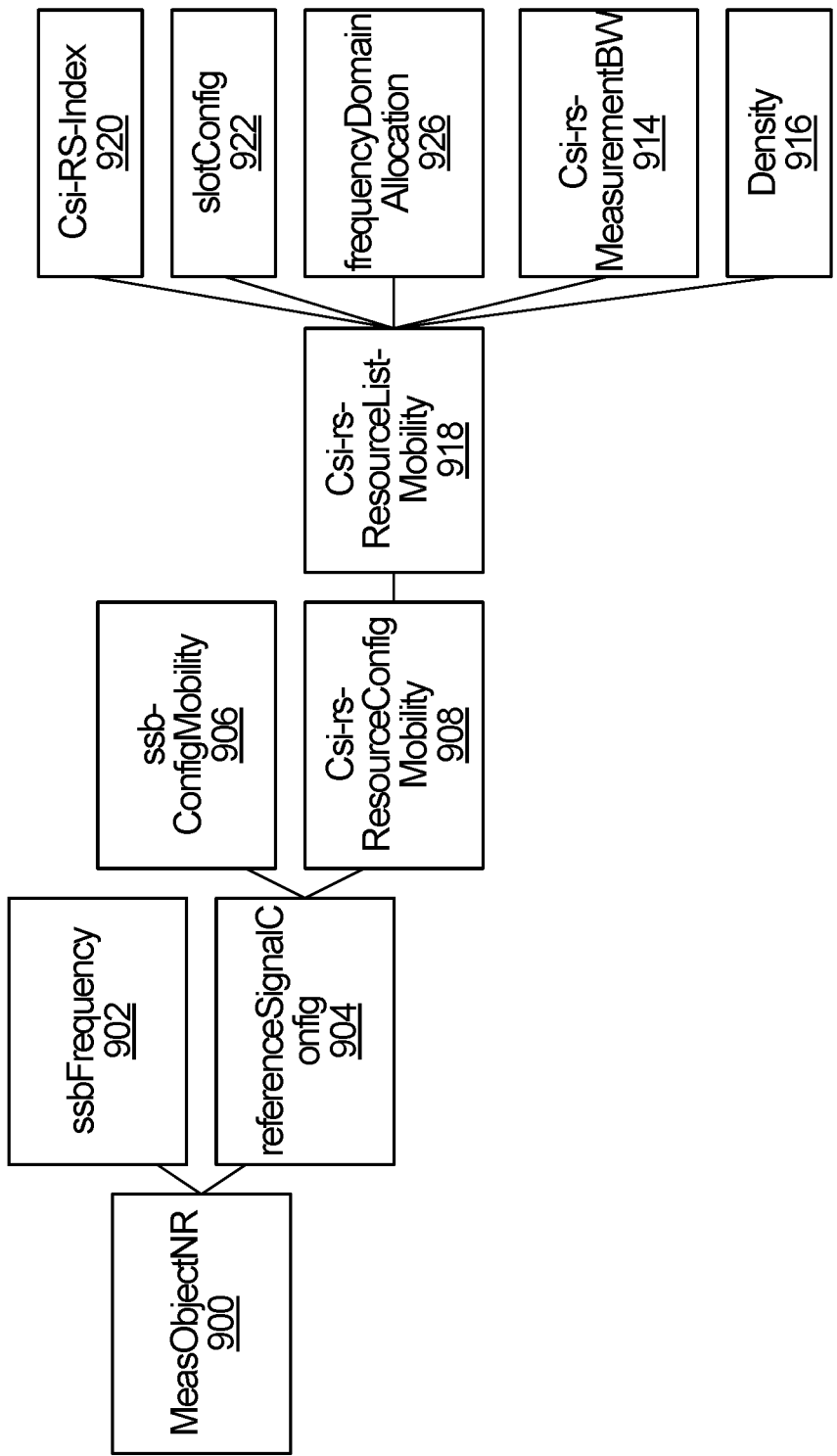

In FIGS. 16 and 17, the associatedSSB 924 is removed from the measObjectNR 900, i.e., there are no associated SSBs for the CSI-RS resources. Therefore, FIG. 17 illustrates an embodiment in which the CSI-RS resources are cell-transparent. The network transmits a higher layer signaling message that does not carry any information about cell identity and the UE has no knowledge of which cells are associated with the CSI-RS resources.

The examples provided in FIGS. 9 to 17 illustrate some of the possible configurations of a measurement object. Higher layer signaling that configures reference signal resources may be performed using other variations of measurement objects. Alternatively, a measurement object might not be defined at all. Instead, reference signal resources may be defined using other forms of higher layer signaling.

Measurement Report Configurations

In the embodiments of FIGS. 10 to 17, the UE performs measurements using the received CSI-RS's. The UE then transmits a measurement report containing one or more measurement results. The measurement results within the measurement report are associated with the CSI-RS resources used to generate them. For example, each measurement result may be associated with the csi-RS-index 920. The measurement results may be specified in the form of a container. Each entry of the container may correspond to a CSI-RS or an SSB.

In some embodiments, a measurement report signaling design is provided that works in conjunction with a resource-specific CSI-RS configuration. The UE only reports measurement results for the resources that are configured for UE mobility and RRM purposes. The network may also configure a set of resources for the UE in a way that allows the UE to move without requiring a higher layer reconfiguration of resources during handovers.

Consider, for example, the UE 116 illustrated in FIG. 5. At Time A, the UE 116 is in the cell 110 and communicating with the TRP 108. The UE 116 may be configured with a set of CSI-RS resources using the MeasObjectNR 900 of FIG. 17. Therefore, the CSI-RS resources are configured for the UE 116 in a cell-transparent and resource-specific manner. The UE 116 receives CSI-RSs from the TRP 108, but the UE 116 has no knowledge that these CSI-RSs were sent by the TRP 108. When the UE transmits a measurement report including measurement results for the CSI-RSs sent by the TRP 108, the measurement report does not include an identifier of the cell 110. The measurement results may only be identified by the configuration of the resources for the corresponding CSI-RS. At Time E in FIG. 5, a handover has occurred from the cell 110 to the cell 114 for the UE 116. Using resource-specific CSI-RS configurations, the CSI-RS resources for the UE 116 might not need to be reconfigured as a result of this handover. The network may instruct the TRP 112 to begin transmitting CSI-RSs in accordance with the CSI-RS resource configuration for the UE 116 used at time A. The network is transparent to the UE 116, and therefore the UE 116 has no knowledge that the CSI-RSs are being transmitted from a different cell. There is also no change in the signaling of the measurement reports transmitted by the UE 116 as a result of the handover.

Further Examples

Some further specific examples are described below with reference to example computer code. The example computer code is meant to be illustrative of some embodiments, and may omit some variables and/or functions for the sake of clarity. Other examples of computer code are also contemplated that may include fewer variables and functions than the examples illustrated below.

FIG. 18 is an example of computer code illustrating a configuration of the csi-RS-ResourceConfigMobility 908. FIG. 18 includes code block 1800. The configuration of the csi-RS-ResourceConfigMobility 908 in code block 1800 generally corresponds to the configuration of the csi-RS-ResourceConfigMobility 908 illustrated in FIG. 9. The csi-RS-ResourceConfigMobility 908 is illustrated as a sequence that includes the variables isServingCellMO 1801, subcarrierSpacing 1802, and the csi-RS-CellList-Mobility 910.

The isServingCellMO 1801 defines the measurement object carrying the isServingCellMO field to be the measurement object corresponding to the current serving cell. In some embodiments, the isServingCellMO 1801 may be removed from the csi-RS-ResourceConfigMobility 908. Instead, a serving cell configuration object could incorporate a measurement object identifier.

The subcarrierSpacing 1802 defines the subcarrier spacing for the CSI-RS resource configuration.

The csi-RS-CellList-Mobility 910 is illustrated as a sequence that includes csi-RS-CellMobility 1803.

The csi-RS-CellMobility 1803 represents cell-specific CSI-RS resources that form the list of cell-specific CSI-RS resources. The csi-RS-CellMobility 1803 is illustrated as a sequence that includes the cellID 912, the csi-rs-MeasurementBW 914, the density 916 and the csi-rs-ResurceList-Mobility 918.

The csi-rs-MeasurementBW 914 is illustrated as a sequence that includes nrofPRBs 1804 and startPRB 1806.

The nrofPRBs 1804 defines the size of the measurement bandwidth of a CSI-RS resource as a number of physical resource blocks (PRBs).

The startPRB 1806 defines the starting PRB of the measurement bandwidth of the CSI-RS resource.

The csi-rs-ResurceList-Mobility 918 is illustrated as a sequence of csi-RS-Resource-Mobility 1808.

The csi-RS-Resource-Mobility 1808 represents the CSI-RS resource configurations that form the list of CSI-RS resource configurations.

According to the example computer code illustrated in FIG. 18, a UE is configured with a list of cells, and each cell has a respective list of CSI-RS resources. The csi-RS-CellMobility 1803 is defined per cell based on the cellId 912 and includes a list of CSI-RS resources, e.g. the csi-rs-ResourceList-Mobility 918, to be used by that cell. The UE knows exactly which CSI-RS resources are used by which cell, and therefore the cells are not transparent to the UE. The CSI-RS measurement bandwidth, e.g. the csi-rs-MeasurementBW 914, and CSI-RS frequency density, e.g. the density 916, are also fixed per cell in FIG. 18.

Figure 19:
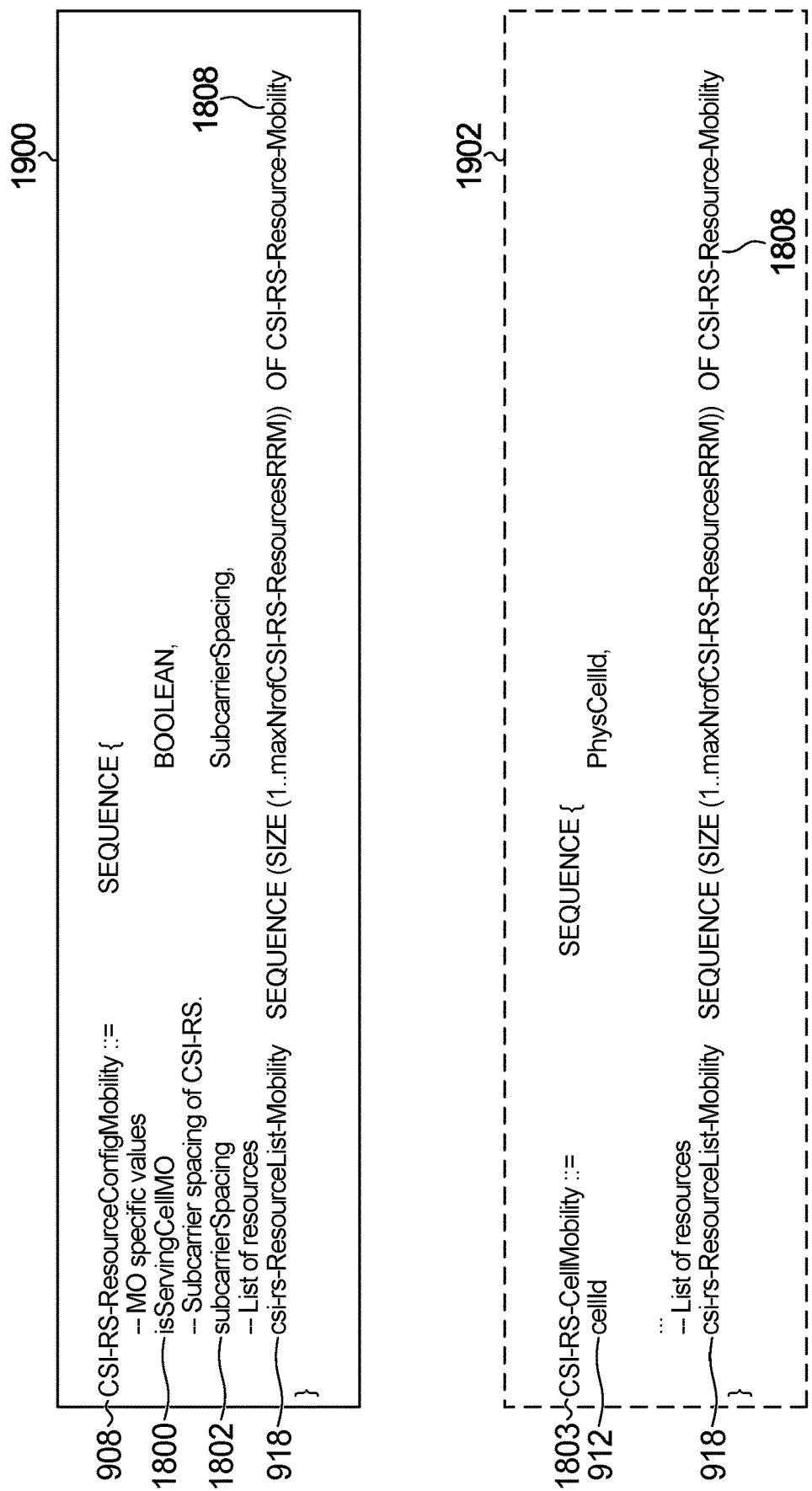

FIG. 19 is another example of computer code illustrating a configuration of the csi-RS-ResourceConfigMobility 908. FIG. 19 includes code block 1900 and code block 1902. The configuration of the csi-RS-ResourceConfigMobility 908 in code block 1900 generally corresponds to the configuration of the csi-RS-ResourceConfigMobility 908 illustrated in FIG. 13. The csi-RS-ResourceConfigMobility 908 is defined as a sequence that includes the isServingCellMO 1800, the subcarrierSpacing 1802, and the csi-RS-ResourceList-Mobility 918.

The contents of code block 1902 include the variables that have been removed from code block 1800 of FIG. 18 to arrive at code block 1900 of FIG. 19. Dashed lines are used around some code blocks, like code block 1902, to highlight deleted code. Code block 1902 includes csi-RS-CellMobility 1803.

In the configuration of the csi-RS-ResourceConfigMobility 908 in code block 1900, the csi-rs-ResourceList-Mobility 918 is not contained within csi-RS-CellMobility 1803. Therefore, the UE may be provided with a list of CSI-RS resources without any cell information, which may result in a resource-specific and/or cell-transparent CSI-RS resource configuration.

Figure 20:
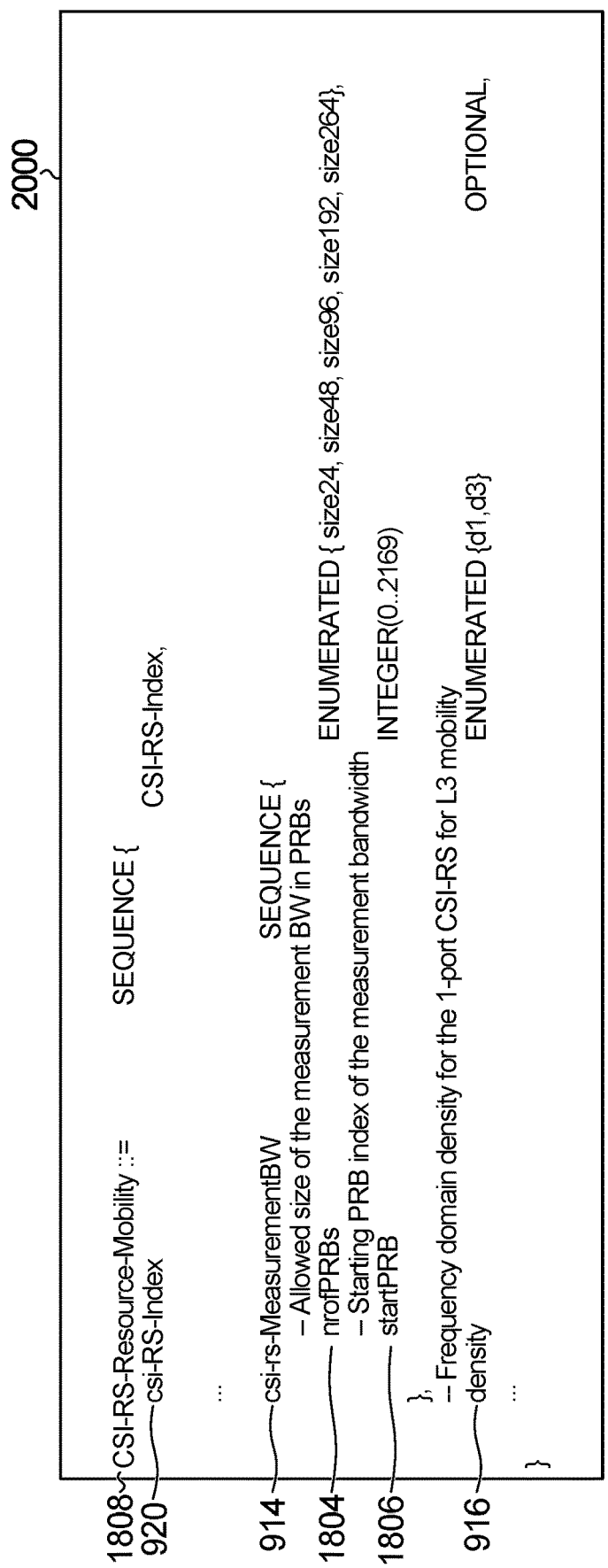

FIG. 20 is an example of computer code illustrating a configuration of the csi-RS-Resource-Mobility 1808. The csi-RS-Resource-Mobility 1808 is defined in code block 2000 as a sequence that includes the csi-RS-Index 920, the csi-rs-MeasurementBW 914 and the density 916. The csi-rs-MeasurementBW 914 and the density 916 that were included in the csi-RS-CellList-Mobility 910 in code block 1800 of FIG. 18 have been moved to the CSI-RS-Resource-Mobility 1808 in code block 2000 of FIG. 20. The movement of the csi-rs-MeasurementBW 914 and the density 916 to the csi-RS-Resource-Mobility 1808 may lead to a more flexible CSI-RS configuration. For example, CSI-RS resource configurations may be fine-tuned for each individual UE. Measurement bandwidth may be set in the CSI-RS resource configurations according to UE capability. Frequency density may be set in the CSI-RS resource configurations depending on whether the UE is in a location near a cell-center or a cell-edge.

The cellId 912 is not included in code block 2000. In some embodiments the cellId 912 may be transferred to another variable, e.g. the associatedSSB 924, or deleted.

FIG. 21 is an example of computer code illustrating a configuration of a measurement reporting object. FIG. 21 includes code block 2100. Code block 2100 defines a configuration of MeasResults 2101, which is a measurement reporting object that includes measurement results for mobility and RRM. For example, the measurement report transmission 710 illustrated in FIG. 7 may include the MeasResults 2101. The MeasResults 2101 is illustrated as a sequence that includes measID 2102, measResultServingFreqList 2104 and measResultNeighCells 2106.

The measId 2102 defines an identifier associated with each measurement report.

The measResultServingFreqList 2104 represents the measurement reports for a list of serving cells. The MeasResultServFreqList 2110 is the type of variable for the measResultServingFreqList 2104 in code block 2100.

The measResultNeighCells 2106 represents the measurement reports for the neighboring cells of a UE. The measResultNeighCells 2106 is illustrated as a choice of variables including measResultListNR 2108.

The measResultListNR 2108 represents measurement results per SSB or CSI-RS.

The MeasResultServFreqList 2110 represents the measurement reports for a list of serving cells. The measResultServFreqList 2110 is illustrated as a sequence that includes MeasResultServFreq 2112.

The measResultServFreq 2112 represents the measurement reports for the serving cells. The MeasresultServFreq 2112 is illustrated as a sequence including servFreqID 2114 and measResultServingCell 2116.

The servFreqId 2114 defines an identifier of each serving cell.

The measResultServingCell 2116 represents a measurement report for the serving cell. The MeasResultNR 2118 is the type of variable for the measResultServingCell 2116 in code block 2100.

The MeasResultNR 2118 represents a list of measurement results per SSB or CSI-RS. The MeasResultNR 2118 is illustrated as a sequence that includes physCellId 2120 and measResult 2122.

The physCellId 2120 defines the physical cell identifier associated with each cell.

The measResult 2122 is illustrated as a sequence that includes cellResults 2124.

The cellResults 2124 represents measurement reports for a cell. The cellResults 2124 is illustrated as a sequence that includes resultsSSB-Cell 2126 and the resultsCSI-RS-Cell 2128.

The resultsSSB-Cell 2126 represents the SSB measurements associated with a cell.

The resultsCSI-RS-Cell 2128 represents the CSI-RS measurements associated with a cell.

In code block 2100, measurement results are derived per cell. The MeasResultNR 2118 includes the physical cell identity for the measurement reports from serving cells and neighboring cells. The UE knows which measurement report belongs to which cell, and therefore the cells are not transparent to the UE.

Figure 22:
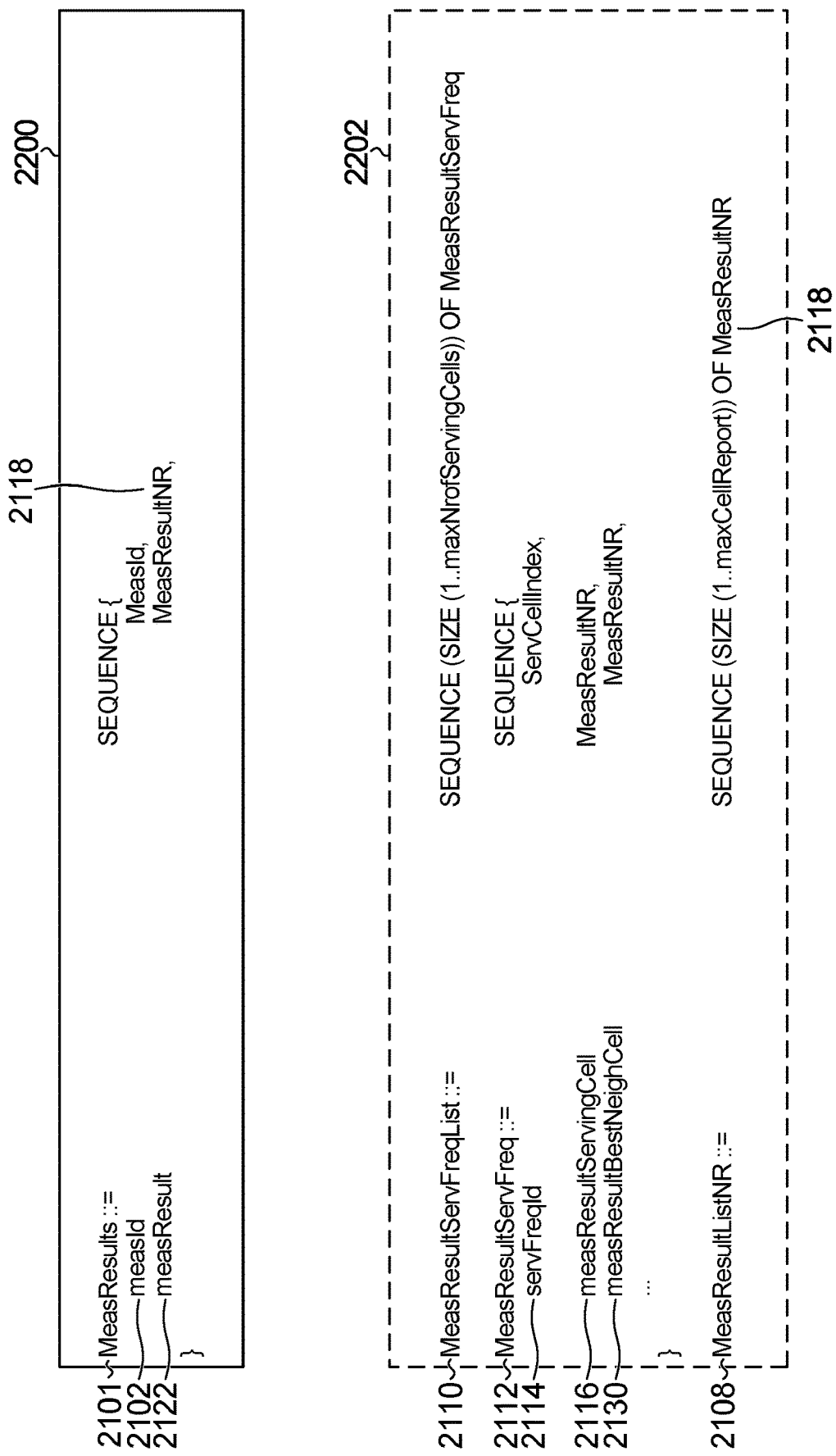

FIG. 22 is another example of computer code illustrating a configuration of MeasResults 2101. FIG. 22 includes code blocks 2200 and 2202. Code block 2200 includes the MeasResults 2101, which is illustrated as a sequence including the measId 2102 and the measResult 2122. Code block 2200 represents a cell-transparent configuration of a measurement object. This configuration of the measurement object includes a measurement identity and a measurement result for a CSI-RS. The measurement result is uniquely identified by the measurement identity. The measurement identity may be provided by the configuration of resources for the CSI-RS.

Code block 2202 represents content that has been removed from code block 2100 to generate code block 2200. Code block 2202 includes the MeasResultsServFreqList 2110, the MeasResultServFreq 2112 and the MeasResultListNR 2108. The MeasResultServFreq 2112 is illustrated as a sequence including the servFreqId 2114, the measResultsServingCell 2116, measResultBestNeighCell 2130. The measResultBestNeighCell 2130 represents a measurement report for the neighboring cell with the best quality of channel to the UE. The variables of code block 2202 may be considered information elements. Removing these information elements from the configuration of MeasResults 2101 in code block 2200 may result in a simpler measurement report structure.

Figure 23:
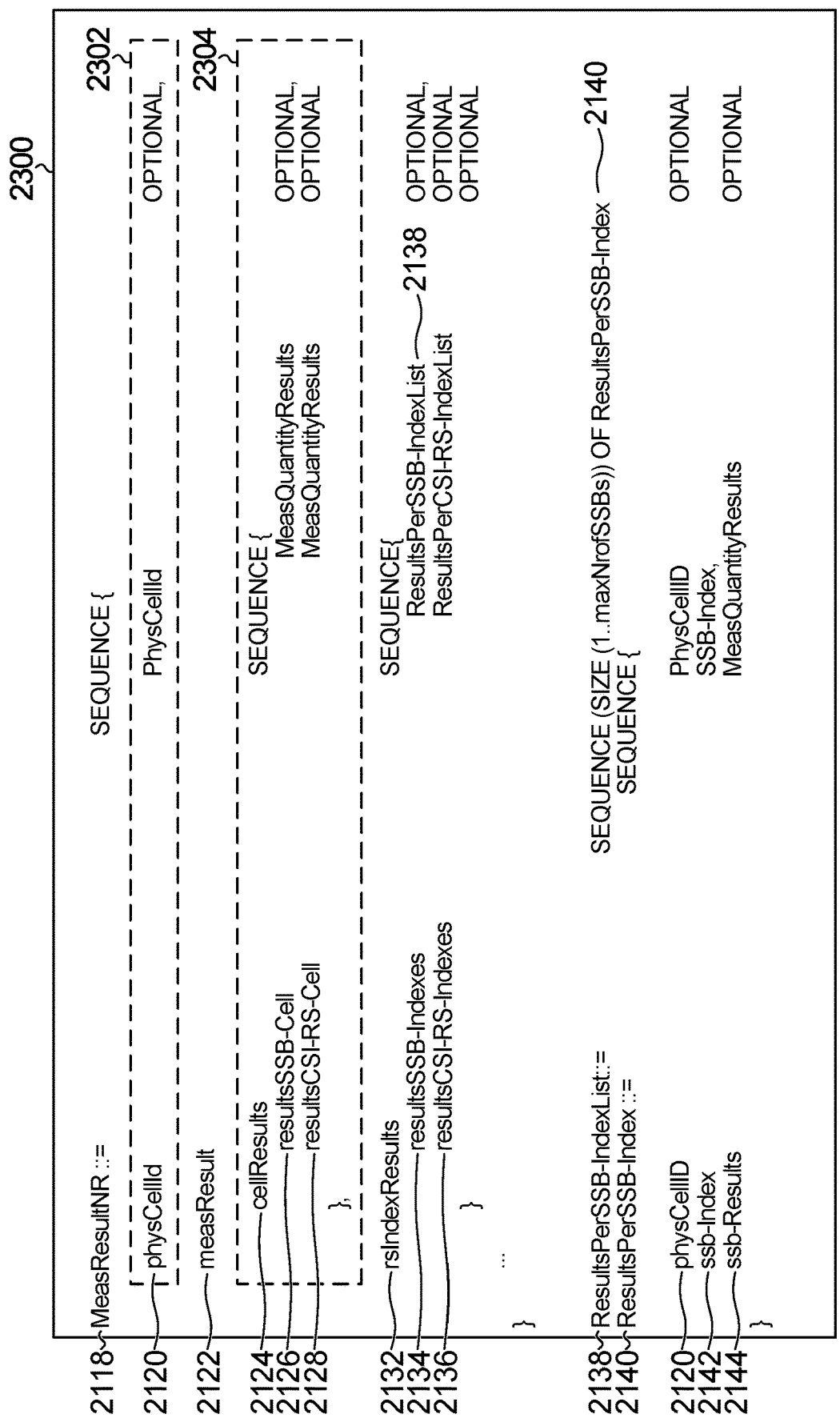

FIG. 23 is an example of computer code illustrating a configuration of MeasResultNR 2118. FIG. 23 includes code block 2300, which includes code blocks 2302 and 2304. Code blocks 2302 and 2304 indicate deleted code. The configuration of MeasResultNR 2118 in code block 2300 is illustrated as a sequence including the measResult 2122. The measResult 2122 is illustrated as a sequence that includes rsIndexResults 2132.

The rsIndexResults 2132 represents reference signal measurement reports per measurement index. The rsIndexResults 2132 is illustrated as a sequence that includes resultsSSB-Indexes 2134 and resultsCSI-RS-Indexes 2136.

The resultsSSB-Indexes 2134 represent SSB measurement reports per SSB index. The resultsSSB-Indexes 2134 is equated to ResultsPerSSB-IndexList 2138 in code block 2300.

The resultsCSI-RS-Indexes 2136 represent CSI-RS measurement reports per CSI-RS index.

The ResultsPerSSB-IndexList 2138 represents a list of SSB measurement results. The ResultsPerSSB-IndexList 2138 is illustrated as a sequence including ResultsPerSSB-Index 2140.

The ResultsPerSSB-Index 2140 represents a SSB measurement result per SSB index. The ResultsPerSSB-Index 2140 is illustrated as a sequence including the physCellId 2120, ssb-Index 2142 and ssb-Results 2144.

The ssb-Index 2142 represents the index of a SSB used to generate a measurement result.

The ssb-Results 2144 represents a SSB measurement result.

Code blocks 2302 and 2304 represent content that has been removed from the configuration of MeasResultNR 2118 in code block 2100 to generate code block 2300. Code block 2302 includes the physCellId 2120. Code block 2304 includes the cellResults 2124. By removing code blocks 2302 and 2304, the physical cell identity is removed from MeasResultNR 2118, which may lead to savings in signaling overhead when transmitting measurement reports. However, the UE still knows exactly which measurement report belongs to which cell because the SSBs inherently contain cell identity information. The cell identifiers are included as part of SSB measurements and the cells are not transparent to the UE.

Specific examples of computer code that relate to UE mechanisms for associated SSB detection acknowledgement are provided below. Referring to FIG. 24, shown is an example of computer code illustrating a configuration of the csi-RS-Resource-Mobility 1808. FIG. 24 includes code block 2400. In code block 2400, the csi-RS-Resource-Mobility 1808 is illustrated as a sequence including the csi-RS-Index 920 and the associatedSSB 924. The associatedSSB 924 is illustrated as a sequence including ssb-Index 928 and isQuasiColocated 920.

According to the configuration of the csi-RS-Resource-Mobility 1808 in code block 2400, the UE does not monitor the CSI-RS resource if the associated SSB for that CSI-RS resource is not detected. This may be considered wasteful from a RRM perspective because the CSI-RS will still be transmitted even if the UE is not monitoring it. There is no mechanism in code block 2400 for the network to determine whether or not an associated SSB was detected.

SSBs require a cell identity in order to be uniquely identified. In code block 2400, the associated SSB does not carry a cell identity because CSI-RS resources are listed per cell. Therefore, UE can determine the cell of an SSB by looking at the associated CSI-RS.

Referring now to FIG. 25, shown is another example of computer code illustrating a configuration of the csi-RS-Resource-Mobility 1808. FIG. 25 includes code block 2500. Code block 2500 generally corresponds to code block 2400, with the addition of the cellId 912 to the associatedSSB 924. This configuration of the associatedSSB 924 in code block 2500 generally corresponds to the configuration of the associatedSSB 924 illustrated in FIG. 15. According to the configuration of the csi-RS-Resource-Mobility 1808 in code block 2500, SSBs are identified using the SSB frequency, SSB index and cell identity associated with the SSB. As a result, the configuration of CSI-RS resources is not required to include a cell identity.

In FIG. 26, shown is an example of computer code for associated SSB detection acknowledgement. FIG. 26 includes code block 2600. Code block 2600 illustrates a configuration of ResultsPerCSI-RS-Index 2146, which represents resource-specific measurement reports. The ResultsPerCSI-RS-Index 2146 is illustrated as a sequence including csi-RS-Index 920, csi-RS-Results 2150 and associatedSSB-received 2152. The csi-RS-Results 2150 represents the results of a measurement report for a certain CSI-RS index. The associatedSSB-received 2152 is a Boolean variable that indicates if an associated SSB has been successfully received by the UE for each CSI-RS resource indicated by a CSI-RS index. If the UE is unable to detect an associated SSB, the UE may transmit a measurement report with the associatedSSB-received 2152 set to FALSE for the CSI-RS resource indicated by the csi-RS-Index 2150. If the UE is able to detect an associated SSB or a physical broadcast channel (PBCH) block, the associatedSSB-received 2152 may be set to TRUE. The UE may report the associatedSSB-received 2152 for every CSI-RS resource.

In FIG. 27, shown is another example of computer code for associated SSB detection acknowledgement. FIG. 27 includes code block 2700. Code block 2700 includes the configuration of the MeasResultNR 2118. The MeasResultNR 2118 is illustrated as a sequence including the measResult 2122. The measResult 2122 is illustrated as a sequence including the rsIndexResults 2132. The rsIndexResults 2132 is illustrated as a sequence including the resultsSSB-Indexes 2134, the resultsCSI-RS-Indexes 2136 and associatedSSB-acknowledgement 2154. The associatedSSB-acknowledgement 2154 represents a list of acknowledgements or negative acknowledgements for the detection of associated SSBs. The associatedSSB-acknowledgement 2154 is equated to ResultsPerAssociatedSSB-IndexList 2156 in code block 2602.

The ResultsPerAssociatedSSB-IndexList 2156 is illustrated as a sequence of ResultsPerAssociatedSSB-Index 2158. The ResultsPerAssociatedSSB-Index 2158 represents measurement results for each associated SSB of a CSI-RS resource. The ResultsPerAssociatedSSB-Index 2158 is illustrated as a sequence including the csi-RS-Index 920 and the associatedSSB-received 2152.

The measurement results illustrated in code blocks 2600 and 2700 include mechanisms for associated SSB detection acknowledgements per CSI-RS resource. The network may use the acknowledgement to reconfigure a CSI-RS resource with a new or different associated SSB. The new or different SSB may be more easily detectable by the UE.

General Embodiments

Figure 28:
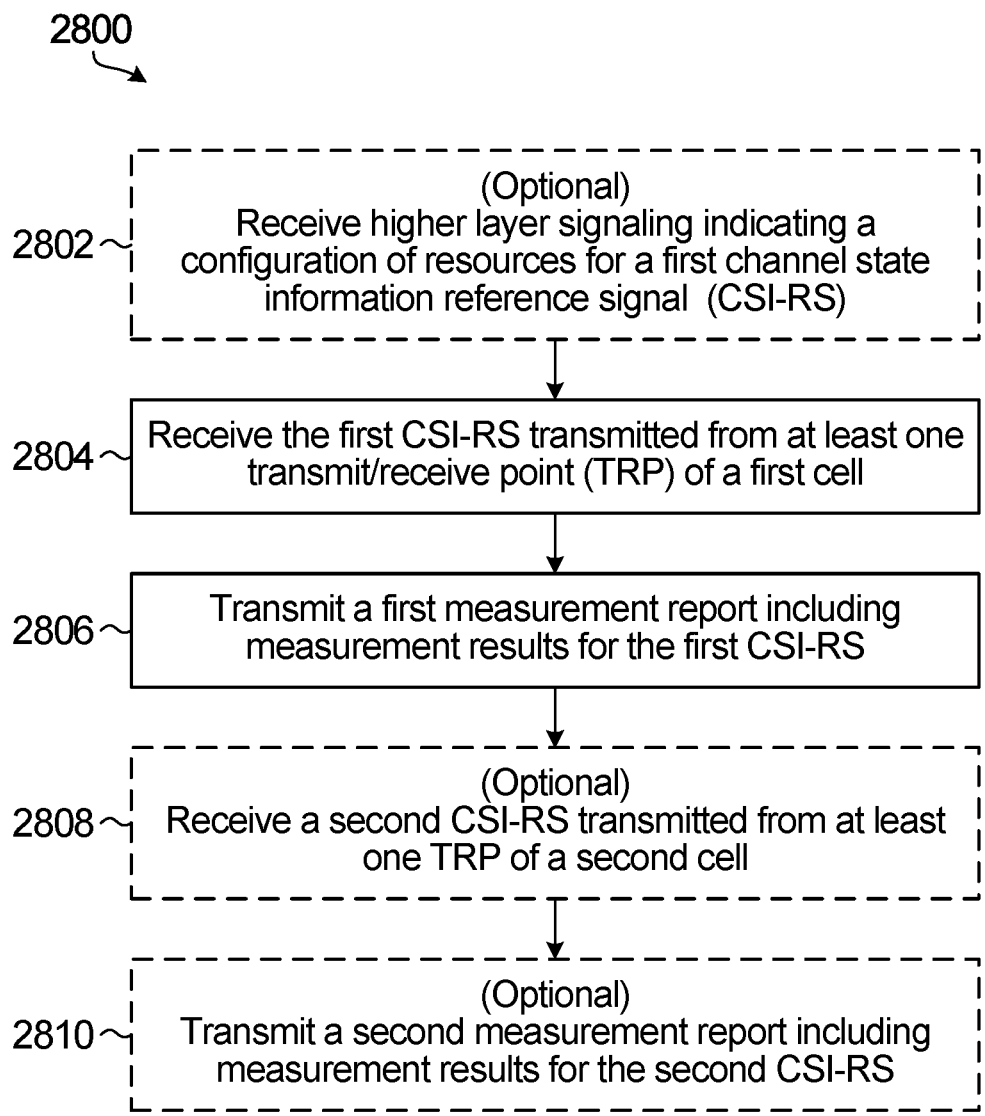
FIG. 28 is a flowchart illustrating a method for performing CSI-RS measurement reporting, according to one embodiment.

Several specific examples are provided above. FIG. 28 is a flowchart illustrating a method 2800 for performing CSI-RS measurement reporting, according to one embodiment. The method 2800 includes optional block 2802, blocks 2804 and 2806, and optional blocks 2808 and 2810. In optional block 2802, higher layer signaling indicating a configuration of resources for a first CSI-RS is received. In some embodiments, these resources are configured independent of an identifier of a cell. An identifier of a cell may include, for example, an indication of a cell identity. In block 2804, the first CSI-RS, which is transmitted from at least one TRP of a first cell on the configured resources, is received. In block 2806, a first measurement report including measurement results for the first CSI-RS is transmitted. The measurement results may be generated by performing measurements using the first CSI-RS. The measurements may relate to channel conditions. In some embodiments, the first measurement report does not include an identifier of the first cell. In further embodiments, the measurement report does not include an indication of a cell identity. In optional block 2808, a second CSI-RS transmitted from at least one TRP of a second cell is received. In optional block 2810, a second measurement report comprising measurement results for the second CSI-RS is transmitted.

In some embodiments, the resources for the second CSI-RS are also configured by the configuration of resources for the first CSI-RS. Therefore, in the case that a UE experiences a handover from the first cell to the second cell, the network can transmit the second CSI-RS from the second cell using the same configuration of resources used by the first cell to transmit the first CSI-RS. No reconfiguration of CSI-RS resources at the UE is required as a result of the handover. If the CSI-RS resources have been configured independent of an identifier of a cell, the UE has no indication as to which cell is sending the first CSI-RS or the second CSI-RS.

In some embodiments, the measurement results for a CSI-RS are identified by the configuration of resources for the CSI-RS. The UE has no indication as to which cell is associated with each measurement result.

In some embodiments, the method 2800 may be performed by a UE, for example, the UE 116 described above with reference to FIGS. 1-6. The at least one TRP of the first cell in method 2800 may be similar to the TRP 108 described above with reference to FIGS. 1-6. The at least one TRP of the second cell in method 2800 may be similar to the TRP 122 described above with reference to FIGS. 1-5.

Figure 29:
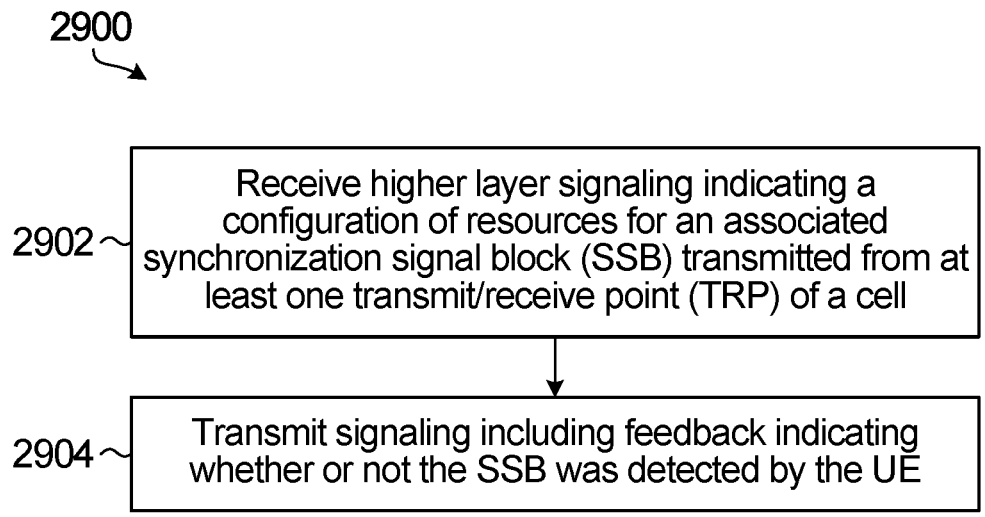
FIG. 29 is a flowchart illustrating a method for reporting SSB detection acknowledgements, according to one embodiment.

FIG. 29 is a flowchart illustrating a method 2900 for reporting SSB detection acknowledgements, according to one embodiment. The method 2900 includes blocks 2902 and 2904. In block 2902, high layer signaling indicating a configuration of resources for an SSB transmitted from at least one TRP of a cell is received. In block 2904, signaling including feedback indicating whether or not the SSB was detected is transmitted. In some embodiments, the signaling including the feedback is included in a measurement report.

In some embodiments, the method 2900 may be performed by a UE, for example, the UE 116 described above with reference to FIGS. 1-6. The TRP in method 2900 may be similar to the TRP 108 described above with reference to FIGS. 1-6.

Figure 30:
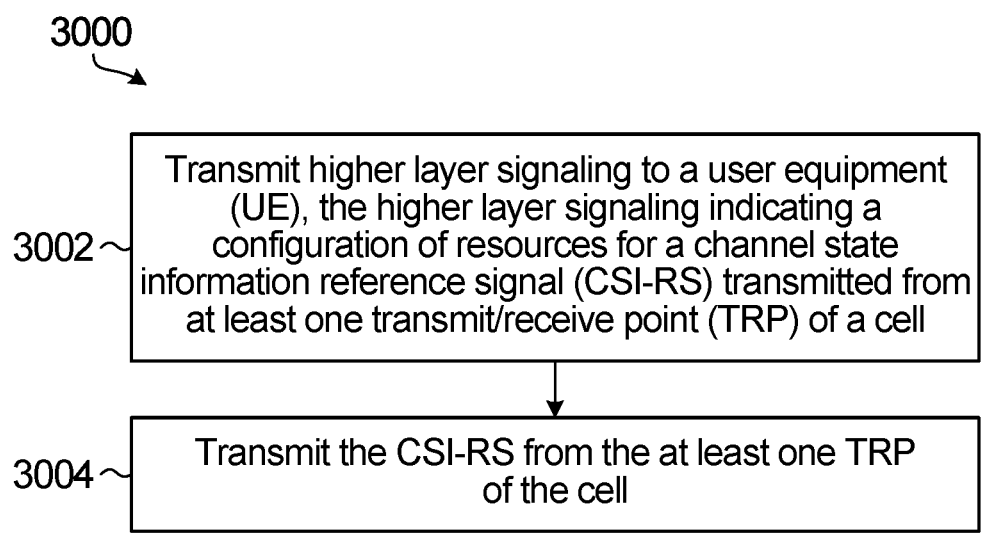
FIG. 30 is a flowchart illustrating a method for performing CSI-RS resource configuration, according to one embodiment.

FIG. 30 is a flowchart illustrating a method 3000 for performing CSI-RS resource configuration, according to one embodiment. The method 3000 includes blocks 3002 and 3004. In block 3002, higher layer signaling is transmitted to a UE, the higher layer signaling indicating a configuration of resources for a CSI-RS transmitted from at least one TRP of a cell. In some embodiments, these resources are configured independent of an identifier of a cell. In some embodiments, the resources for the CSI-RS are configured independently from one another. In block 3004, the CSI-RS is transmitted from the at least one TRP of the cell.

In some embodiments, at least one of the resources is associated with the identifier of the cell. An example of these embodiments is described above with reference to FIG. 13.

In some embodiments, the configuration of the resources for the CSI-RS includes a configuration of resources for an associated SSB transmitted from the at least one TRP of the cell.

In some embodiments, the configuration of resources for the associated SSB includes the identifier of the cell. An example of these embodiments is described above with reference to FIG. 15.

In some embodiments, at least one of the resources is not associated with the identifier of the cell. An example of these embodiments is described above with reference to FIG. 17.

In some embodiments, the configuration of the resources for the CSI-RS includes a configuration of resources for a measurement report transmitted from the UE. The measurement report does not include the identifier of the cell.

In some embodiments, the at least one TRP in method 3000 may be similar to the TRP 108 described above with reference to FIGS. 1-6. The UE of method 3000 may be similar to the UE 116 described above with reference to FIGS. 1-6.

Other Example Operating Environments

Figure 31:
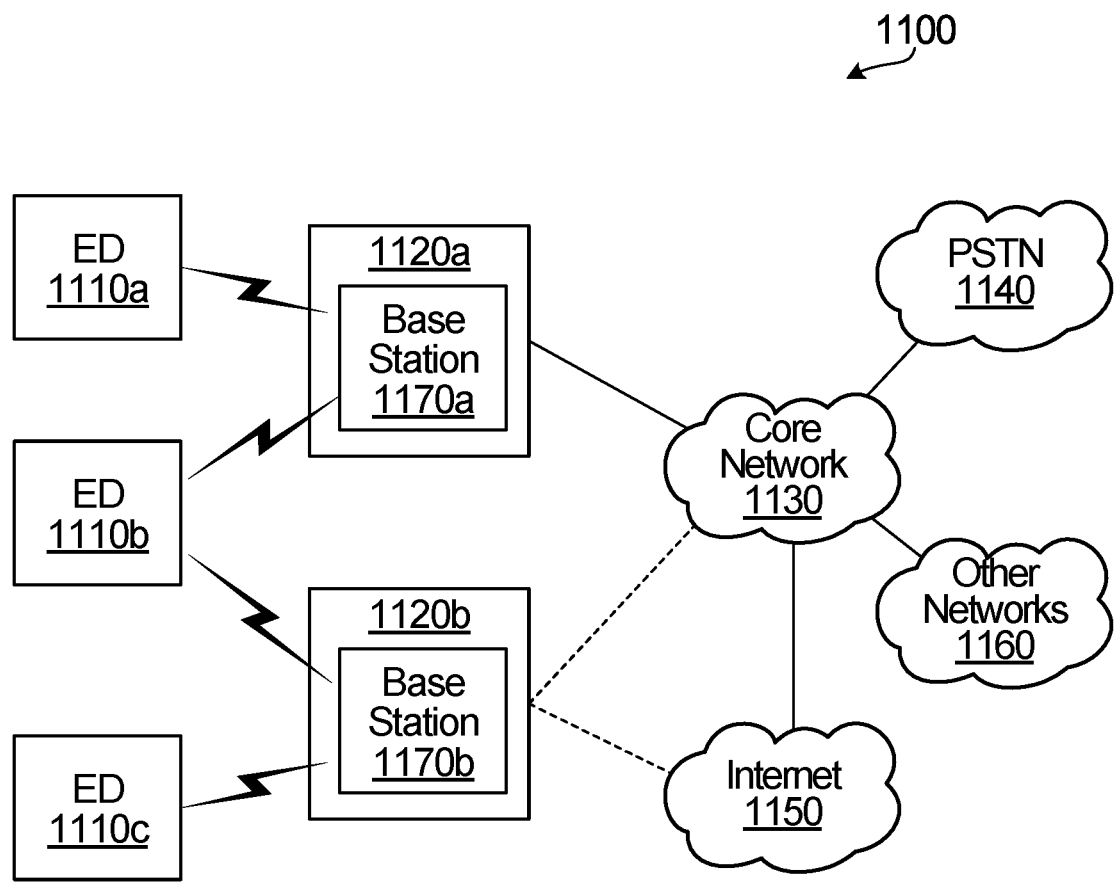
FIG. 31 illustrates an example communication system in which embodiments of the present disclosure could be implemented.

FIG. 31 illustrates an example communication system 1100 in which embodiments of the present disclosure could be implemented. In general, the system 1100 enables multiple wireless or wired elements to communicate data and other content. The purpose of the system 1100 may be to provide content (voice, data, video, text) via broadcast, narrowcast, user device to user device, etc. The system 1100 may operate efficiently by sharing resources such as bandwidth.

In this example, the communication system 1100 includes electronic devices (ED) 1110a-1110c, radio access networks (RANs) 1120a-1120b, a core network 1130, a public switched telephone network (PSTN) 1140, the Internet 1150, and other networks 1160. While certain numbers of these components or elements are shown in FIG. 31, any reasonable number of these components or elements may be included in the system 1100.

The EDs 1110a-1110c are configured to operate, communicate, or both, in the system 1100. For example, the EDs 1110a-1110c are configured to transmit, receive, or both via wireless communication channels. Each ED 1110a-1110c represents any suitable end user device for wireless operation and may include such devices (or may be referred to) as a user equipment/device (UE), wireless transmit/receive unit (WTRU), mobile station, mobile subscriber unit, cellular telephone, station (STA), machine type communication device (MTC), personal digital assistant (PDA), smartphone, laptop, computer, touchpad, wireless sensor, or consumer electronics device. The UE 116 described earlier is an example of an ED. Any UE described earlier may instead be an ED.

In FIG. 31, the RANs 1120a-1120b include base stations 1170a-1170b, respectively. Each base station 1170a-1170b is configured to wirelessly interface with one or more of the EDs 1110a-1110c to enable access to any other base station 1170a-1170b, the core network 1130, the PSTN 1140, the Internet 1150, and/or the other networks 1160. For example, the base stations 1170a-1170b may include (or be) one or more of several well-known devices, such as a base transceiver station (BTS), a Node-B (NodeB), an evolved NodeB (eNodeB), a Home eNodeB, a gNodeB (sometimes called a "gigabit" NodeB), a transmission point (TP), a transmit/receive point (TRP), a site controller, an access point (AP), or a wireless router. A TRP is an example of a base station, and the TRPs described earlier may instead be called base stations.

Any ED 1110a-1110c may be alternatively or jointly configured to interface, access, or communicate with any other base station 1170a-1170b, the internet 1150, the core network 1130, the PSTN 1140, the other networks 1160, or any combination of the preceding. Optionally, the system may include RANs, such as RAN 1120b. The corresponding base station 1170b accesses the core network 1130 via the internet 1150, as shown.

The EDs 1110a-1110c and base stations 1170a-1170b are examples of communication equipment that can be configured to implement some or all of the functionality and/or embodiments described herein. In the embodiment shown in FIG. 31, the base station 1170a forms part of the RAN 1120a, which may include other base stations, base station controller(s) (BSC), radio network controller(s) (RNC), relay nodes, elements, and/or devices. Any base station 1170a, 1170b may be a single element, as shown, or multiple elements, distributed in the corresponding RAN, or otherwise. Also, the base station 1170b forms part of the RAN 1120b, which may include other base stations, elements, and/or devices. Each base station 1170a-1170b may be configured to operate to transmit and/or receive wireless signals within a particular geographic region or area, sometimes referred to as a coverage area. A cell may be further divided into cell sectors, and a base station 1170a-1170b may, for example, employ multiple transceivers to provide service to multiple sectors. In some embodiments a base station 1170a-1170b may be implemented as pico or femto nodes where the radio access technology supports such. In some embodiments, multiple-input multiple-output (MIMO) technology may be employed having multiple transceivers for each coverage area. The number of RAN 1120a-1120b shown is exemplary only. Any number of RAN may be contemplated when devising the system 1100.

The base stations 1170a-1170b communicate with one or more of the EDs 1110a-1110c over one or more air interfaces 1190 using wireless communication links e.g. RF, μWave, IR, etc. The air interfaces 1190 may utilize any suitable radio access technology. For example, the system 1100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 1190.

A base station 1170a-1170b may implement Universal Mobile Telecommunication System (UMTS) Terrestrial Radio Access (UTRA) to establish an air interface 1190 using wideband CDMA (WCDMA). In doing so, the base station 1170a-1170b may implement protocols such as HSPA, HSPA+ optionally including HSDPA, HSUPA or both. Alternatively, a base station 1170a-1170b may establish an air interface 1190 with Evolved UTMS Terrestrial Radio Access (E-UTRA) using LTE, LTE-A, and/or LTE-B. It is contemplated that the system 1100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 1120a-1120b are in communication with the core network 1130 to provide the EDs 1110a-1110c with various services such as voice, data, and other services. Understandably, the RANs 1120a-1120b and/or the core network 1130 may be in direct or indirect communication with one or more other RANs (not shown), which may or may not be directly served by core network 1130, and may or may not employ the same radio access technology as RAN 120a, RAN 120b or both. The core network 1130 may also serve as a gateway access between (i) the RANs 1120a-1120b or EDs 1110a-1110c or both, and (ii) other networks (such as the PSTN 1140, the Internet 1150, and the other networks 1160). In addition, some or all of the EDs 1110a-1110c may include functionality for communicating with different wireless networks over different wireless links using different wireless technologies and/or protocols. PSTN 1140 may include circuit switched telephone networks for providing plain old telephone service (POTS). Internet 1150 may include a network of computers and subnets (intranets) or both, and incorporate protocols, such as IP, TCP, UDP. EDs 1110a-1110c may be multimode devices capable of operation according to multiple radio access technologies, and incorporate multiple transceivers necessary to support such.

It is contemplated that the communication system 1100 as illustrated in FIG. 31 may support a New Radio (NR) cell, which also may be referred to as hyper cell. Each NR cell includes one or more TRPs using the same NR cell ID. The NR cell ID is a logical assignment to all physical TRPs of the NR cell and may be carried in a broadcast synchronization signal. The NR cell may be dynamically configured. The boundary of the NR cell may be flexible and the system dynamically adds or removes TRPs to from the NR cell. The serving and target cells described earlier (e.g. 110 and 114 in FIG. 1) may be examples of NR cells.

In one embodiment, a NR cell may have one or more TRPs within the NR cell transmitting a UE-specific data channel, which serves a UE. The one or more TRPs associated with the UE specific data channel are also UE specific and are transparent to the UE. Multiple parallel data channels within a single NR cell may be supported, each data channel serving a different UE.

In another embodiment, a broadcast common control channel and a dedicated control channel may be supported. The broadcast common control channel may carry common system configuration information transmitted by all or partial TRPs sharing the same NR cell ID. Each UE can decode information from the broadcast common control channel in accordance with information tied to the NR cell ID. One or more TRPs within a NR cell may transmit a UE specific dedicated control channel, which serves a UE and carries UE-specific control information associated with the UE. Multiple parallel dedicated control channels within a single NR cell may be supported, each dedicated control channel serving a different UE. The demodulation of each dedicated control channel may be performed in accordance with a UE-specific reference signal (RS), the sequence and/or location of which may be linked to the UE ID or other UE specific parameters.

In some embodiments, one or more of these channels, including the dedicated control channels and the data channels, may be generated in accordance with a UE specific parameter, such as a UE ID, and/or an NR cell ID. Further, the UE specific parameter and/or the NR cell ID can be used to differentiate transmissions of the data channels and control channels from different NR cells.

An ED, such as a UE, may access the communication system 1100 through at least one of the TRP within a NR cell using a UE dedicated connection ID, which allows one or more physical TRPs associated with the NR cell to be transparent to the UE. The UE dedicated connection ID is an identifier that uniquely identifies the UE in the NR cell. For example, the UE dedicated connection ID may be identified by a sequence. In some implementations, the UE dedicated connection ID is assigned to the UE after an initial access. The UE dedicated connection ID, for example, may be linked to other sequences and randomizers which are used for PHY channel generation.

In some embodiments, the UE dedicated connection ID remains the same as long as the UE is communicating with a TRP within the NR cell. In some embodiments, the UE can keep original UE dedicated connection ID when crossing NR cell boundary. For example, the UE can only change its UE dedicated connection ID after receiving signaling from the network.

In some embodiments, any number of NR cells may be implemented in the communication system 1100. For example, FIG. 32 illustrates two neighboring NR cells in an example communication system, in accordance with an embodiment of the present disclosure.

Figure 32:
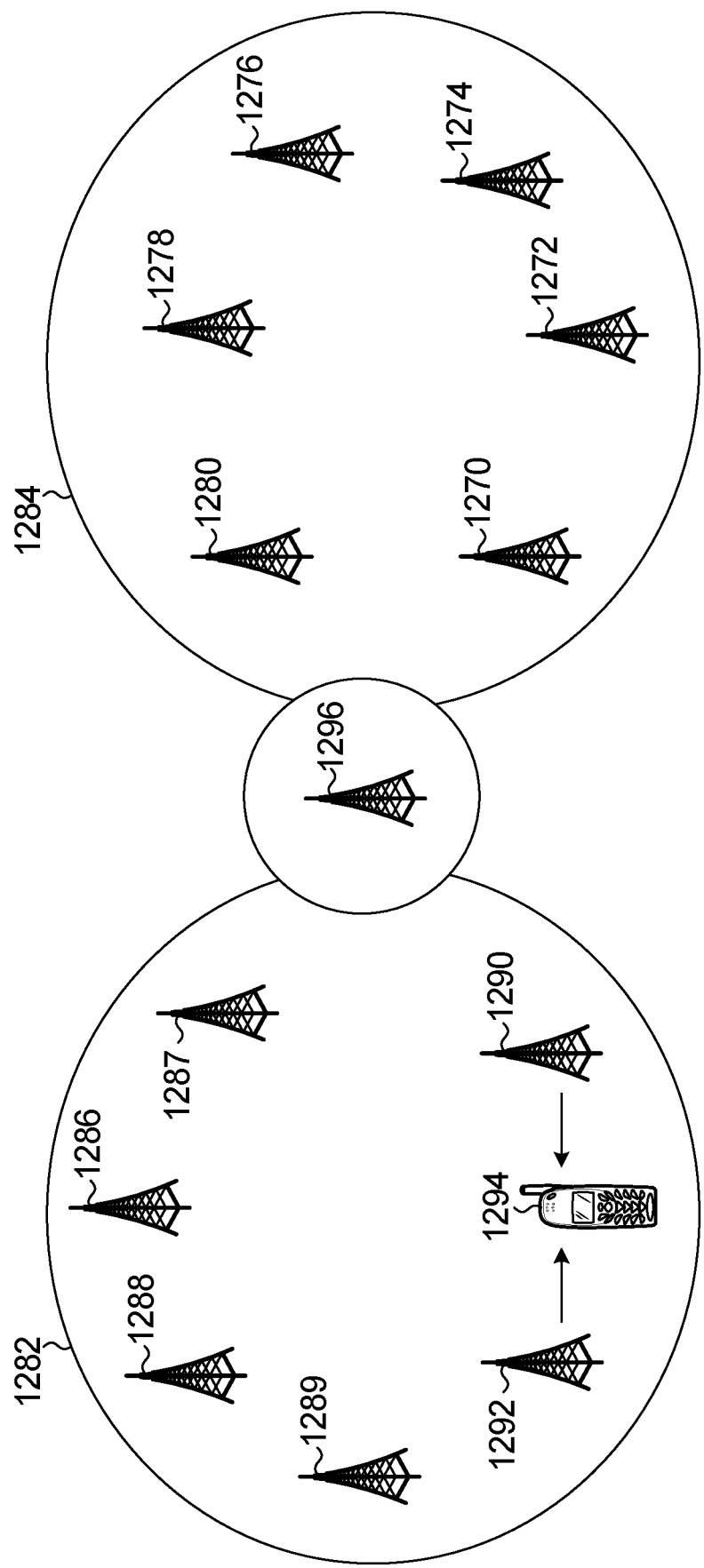
FIG. 32 illustrates two neighboring new radio (NR) cells of an example communication system in which embodiments of the present disclosure could be implemented.

As illustrated in FIG. 32, NR cells 1282, 1284 each include multiple TRPs that are assigned the same NR cell ID. For example, NR cell 1282 includes TRPs 1286, 1287, 1288, 1289, 1290, and 1292. TRPs 1290, 1292 communicates with an ED, such as UE 1294. It is obviously understood that other TRPs in NR cell 1282 may communicate with UE 1294. NR cell 1284 includes TRPs 1270, 1272, 1274, 1276, 1278, and 1280. TRP 1296 is assigned to NR cells 1282, 1284 at different times, frequencies or spatial directions and the system may switch the NR cell ID for transmit point 1296 between the two NR cells 1282 and 1284. It is contemplated that any number (including zero) of shared TRPs between NR cells may be implemented in the system.

In one embodiment, the system dynamically updates the NR cell topology to adapt to changes in network topology, load distribution, and/or UE distribution. In some implementations, if the concentration of UEs increases in one region, the system may dynamically expand the NR cell to include TRPs near the higher concentration of UEs. For example, the system may expand NR cell to include other TRPs if the concentration of UEs located at the edge of the NR cell increases above a certain threshold. As another example, the system may expand NR cell to include a greater concentration of UEs located between two hyper cells. In some implementations, if the traffic load increases significantly at one region, the system may also expand the NR cell associated with the region to include TRPs for the increased traffic load. For example, if the traffic load of a portion of the network exceeds a predetermined threshold, the system may change the NR cell ID of one or more TRPs that are transmitting to the impacted portion of the network.

In another embodiment, the system may change the NR cell ID associated with TRP 1296 from the NR cell ID of NR cell 1282 to the NR cell ID of NR cell 1284. In one implementation, the system can change the association of a TRP with different NR cells periodically, such as every 1 millisecond. With such a flexible NR cell formation mechanism, all UEs can be served by the best TRPs so that virtually there are no cell edge UEs.

In yet another embodiment, the shared TRP 1296 can reduce interference for UEs located at the boundary between the two NR cells 1282, 1284. UEs that are located near the boundaries of two NR cells 1282, 1284 experience fewer handovers because the shared TRP is associated with either NR cell at different times, frequencies or spatial directions. Further, as a UE moves between the NR cells 1282, 1284, the transition is a smoother experience for the user. In one embodiment, the network changes the NR cell ID of the TRP 1296 to transition a UE moving between NR cells 1282, 1284.

The system may apply TRP selection techniques to minimize intra-NR cell interference and inter-NR cell interference. In one embodiment, a TRP sends a downlink channel state information (CSI)-reference symbol (RS). Some pilot (also known as reference signal) ports may be defined such that the UEs can measure the channel state information and report it back to the network. A CSI-RS port is a pilot port defined as a set of known symbols from a sequence transmitted over known resource elements (for example OFDM resource elements) for UEs to measure the channel state. A UE assigned to measure a particular CSI-RS port can measure the transmitted CSI-RS sequence, measure the associated channel state and report it back to the network. The network may select the best TRPs for all served UEs based on the downlink measurements. In another embodiment, a TRP detects an uplink sounding reference signal (SRS) sequence from a UE in the configured time-frequency resources. For example, Constant Amplitude Zero Auto Correlation (CAZAC) sequences such as ZC sequences can be used as base sequences for SRS. The TRP reports a measurement of the detected uplink SRS sequence to the network. The controller then selects the optimal TRPs for all served UEs based on the measurements.

Figure 33:
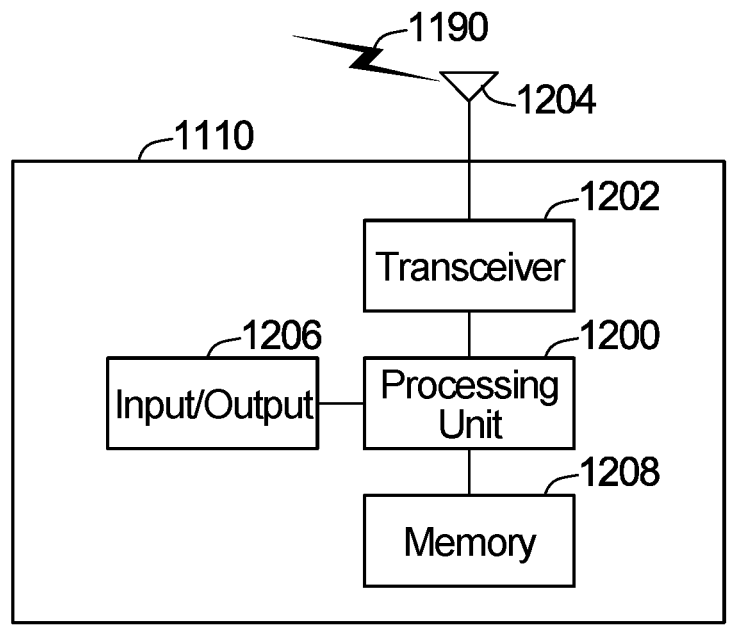
FIGS. 33 and 34 illustrate example devices that may implement the methods and teachings according to this disclosure.
Figure 34:
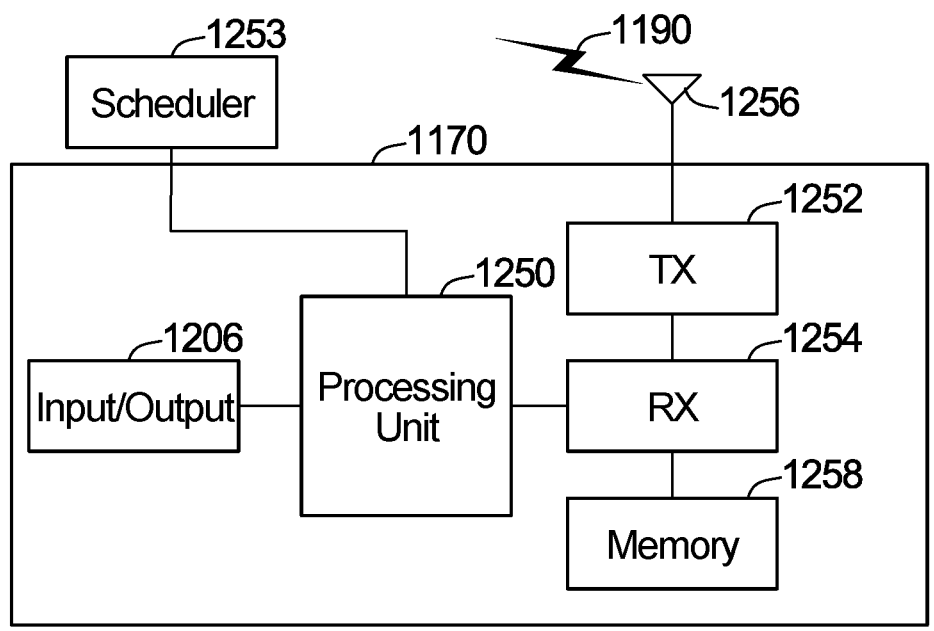

FIGS. 33 and 34 illustrate other example devices that may implement the methods and teachings according to this disclosure. In particular, FIG. 33 illustrates an example ED 1110 (e.g UE 116 in FIG. 1), and FIG. 34 illustrates an example base station 1170 (e.g. TRP 108 in FIG. 1). These components could be used in the system 1100 or in any other suitable system.

As shown in FIG. 33, the ED 1110 includes at least one processing unit 1200. The processing unit 1200 implements various processing operations of the ED 1110. For example, the processing unit 1200 could perform signal coding, data processing, power control, input/output processing, or any other functionality enabling the ED 1110 to operate in the system 1100. The processing unit 1200 may also be configured to implement some or all of the functionality and/or embodiments described in more detail above. Each processing unit 1200 includes any suitable processing or computing device configured to perform one or more operations. Each processing unit 1200 could, for example, include a microprocessor, microcontroller, digital signal processor, field programmable gate array, or application specific integrated circuit.

The ED 1110 also includes at least one transceiver 1202. The transceiver 1202 is configured to modulate data or other content for transmission by at least one antenna or NIC (Network Interface Controller) 1204. The transceiver 1202 is also configured to demodulate data or other content received by the at least one antenna 1204. Each transceiver 1202 includes any suitable structure for generating signals for wireless transmission and/or processing signals received wirelessly or by wire. Each antenna 1204 includes any suitable structure for transmitting and/or receiving wireless signals. One or multiple transceivers 1202 could be used in the ED 1110, and one or multiple antennas 1204 could be used in the ED 1110. Although shown as a single functional unit, a transceiver 1202 could also be implemented using at least one transmitter and at least one separate receiver.

The ED 1110 further includes one or more input/output devices 1206 or interfaces. The input/output devices 1206 facilitate interaction with a user or other devices (network communications) in the network. Each input/output device 1206 includes any suitable structure for providing information to or receiving/providing information from a user, such as a speaker, microphone, keypad, keyboard, display, or touch screen, including network interface communications.

In addition, the ED 1110 includes at least one memory 1208. The memory 1208 stores instructions and data used, generated, or collected by the ED 1110. For example, the memory 1208 could store software instructions or modules configured to implement some or all of the functionality and/or embodiments described above and that are executed by the processing unit(s) 1200. Each memory 1208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 34, the base station 1170 includes at least one processing unit 1250, at least one transmitter 1252, at least one receiver 1254, one or more antennas 1256, at least one memory 1258, and one or more input/output devices or interfaces 1266. A transceiver, not shown, may be used instead of the transmitter 1252 and receiver 1254. A scheduler 1253 may be coupled to the processing unit 1250. The scheduler 1253 may be included within or operated separately from the base station 1170. The processing unit 1250 implements various processing operations of the base station 1170, such as signal coding, data processing, power control, input/output processing, or any other functionality. The processing unit 1250 can also be configured to implement some or all of the functionality and/or embodiments described in more detail above. Each processing unit 1250 includes any suitable processing or computing device configured to perform one or more operations. Each processing unit 1250 could, for example, include a microprocessor, microcontroller, digital signal processor, field programmable gate array, or application specific integrated circuit.

Each transmitter 1252 includes any suitable structure for generating signals for wireless transmission to one or more EDs or other devices. Each receiver 1254 includes any suitable structure for processing signals received wirelessly or by wire from one or more EDs or other devices. Although shown as separate components, at least one transmitter 1252 and at least one receiver 1254 could be combined into a transceiver. Each antenna 1256 includes any suitable structure for transmitting and/or receiving wireless signals. While a common antenna 1256 is shown here as being coupled to both the transmitter 1252 and the receiver 1254, one or more antennas 1256 could be coupled to the transmitter(s) 1252, and one or more separate antennas 1256 could be coupled to the receiver(s) 1254. Each memory 1258 includes any suitable volatile and/or non-volatile storage and retrieval device(s) such as those described above in connection to the ED 1110. The memory 1258 stores instructions and data used, generated, or collected by the base station 1170. For example, the memory 1258 could store software instructions or modules configured to implement some or all of the functionality and/or embodiments described above and that are executed by the processing unit(s) 1250.

Each input/output device 1266 facilitates interaction with a user or other devices (network communications) in the network. Each input/output device 1266 includes any suitable structure for providing information to or receiving/providing information from a user, including network interface communications.

It should be appreciated that one or more steps of the embodiment methods provided herein may be performed by corresponding units or modules, e.g. the units or modules shown in FIGS. 6, 33, and/or 34. For example, a signal may be transmitted by a transmitting unit or a transmitting module. A signal may be received by a receiving unit or a receiving module. A signal may be processed by a processing unit or a processing module. Other steps may be performed by the transmitter 202, receiver 204, decoder 222, the downlink message generator 224, the encoder 226, the DCI generator 228, the SNR detector 230, the configured resources module 234, the higher layer signal generator 236, the reference signal generator 240, the memory 238, the transmitter 252, the receiver 254, the uplink message generator 262, encoder 264, downlink message processor 266, decoder 268, higher layer signal processor 256, the measurement report generator 258, the memory 272, transceiver 1202, processing unit 1200, transmitter 1252, receiver 1254, scheduler 1253, and/or processing unit 1250 described herein. The respective units/modules may be hardware, software, or a combination thereof. For instance, one or more of the units/modules may be an integrated circuit, such as FPGAs or ASICs. It will be appreciated that where the modules are software, they may be retrieved by a processor, in whole or part as needed, individually or together for processing, in single or multiple instances as required, and that the modules themselves may include instructions for further deployment and instantiation.

CONCLUSION

Although the present invention has been described with reference to specific features and embodiments thereof, various modifications and combinations can be made thereto without departing from the invention. For example, the invention may be applied to purposes other than mobility and RRM measurements. The invention may also be applied to other future communication systems, like beyond 5G or 6G. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

What is claimed is:
1. A method comprising:
receiving higher layer signaling indicating a configuration of resources for a channel state information reference signal (CSI-RS) for mobility to a first cell from a second cell within a network, wherein the resources are configured independent of an identifier of the first cell;

receiving the CSI-RS transmitted from at least one transmit/receive point (TRP) of the first cell; and transmitting a measurement report including measurement results for the CSI-RS, wherein the measurement report does not include the identifier of the first cell.

2. The method of claim 1, wherein, in the measurement report, the measurement results for the CSI-RS are identified by the configuration of resources for the CSI-RS.

3. The method of claim 1, wherein the CSI-RS is a first CSI-RS, and the measurement report is a first measurement report, the method further comprising:

receiving a second CSI-RS transmitted from at least one TRP of the second cell, wherein resources for the second CSI-RS are also configured by the configuration of resources for the first CSI-RS; and transmitting a second measurement report comprising measurement results for the second CSI-RS.

4. An apparatus comprising:
a receiver configured to:
receive higher layer signaling indicating a configuration of resources for a channel state information reference signal (CSI-RS) for mobility to a first cell from a second cell within a network, wherein the resources are configured independent of an identifier of the first cell, and receive the CSI-RS transmitted from at least one transmit/receive point (TRP) of the first cell; and a transmitter configured to transmit a measurement report including measurement results for the CSI-RS, wherein the measurement report does not include the identifier of the first cell.

5. The apparatus of claim 4, wherein, in the measurement report, the measurement results for the CSI-RS are identified by the configuration of resources for the CSI-RS.

6. The apparatus of claim 4, wherein the CSI-RS is a first CSI-RS, and the measurement report is a first measurement report, wherein the receiver is further configured to receive a second CSI-RS transmitted from at least one TRP of the second cell, wherein resources for the second CSI-RS are also configured by the configuration of resources for the first CSI-RS; and wherein the transmitter is further configured to transmit a second measurement report comprising measurement results for the second CSI-RS.

7. A method performed by a user equipment (UE), the method comprising:

receiving higher layer signaling indicating a first configuration of resources for a first associated synchronization signal block (SSB) transmitted from at least one transmit/receive point (TRP) of a cell;

transmitting signaling comprising feedback indicating that the first associated SSB was not detected by the UE; and receiving further higher layer signaling indicating a second configuration of resources for a second associated SSB transmitted from the at least one TRP, the second configuration of resources being different from the first configuration of resources.

8. The method of claim 7, wherein the signaling comprising the feedback is included in a measurement report.

9. The method of claim 8, wherein the measurement report corresponds to an associated channel state information reference signal (CSI-RS) resource.

10. An apparatus comprising:
a receiver configured to receive higher layer signaling indicating a first configuration of resources for a first associated synchronization signal block (SSB) transmitted from at least one transmit/receive point (TRP) of a cell; and a transmitter configured to transmit signaling comprising feedback, the feedback indicating that the first associated SSB was not detected when the apparatus does not detect the first associated SSB, wherein the receiver is further configured to receive further higher layer signaling indicating a second configuration of resources for a second associated SSB transmitted from the at least one TRP, the second configuration of resources being different from the first configuration of resources.

11. The apparatus of claim 10, wherein the signaling comprising the feedback is included in a measurement report.

12. The apparatus of claim 11, wherein the measurement report corresponds to an associated channel state information reference signal (CSI-RS) resource.

13. The method of claim 1, wherein the resources are configured independent of an identifier of the second cell.

14. The apparatus of claim 4, wherein the resources are configured independent of an identifier of the second cell.

* * * * *